(12) United States Patent
Kochi et al.

(10) Patent No.: US 6,567,571 B1
(45) Date of Patent: May 20, 2003

(54) IMAGE SENSING DEVICE CAPABLE OF OUTPUTTING IMAGE SIGNALS BY BLOCKS AND PROCESSING CIRCUIT WHICH PROCESSES IMAGE SIGNALS BY BLOCKS

(75) Inventors: Tetsunobu Kochi, Hiratsuka (JP); Shigetoshi Sugawa, Atsugi (JP); Isamu Ueno, Hadano (JP); Katsuhisa Ogawa, Machida (JP); Toru Koizumi, Yokohama (JP); Katsuhito Sakurai, Machida (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,865

(22) Filed: Jun. 23, 1999

(30) Foreign Application Priority Data

Jun. 24, 1998 (JP) .......................................... 10-177643
Jul. 7, 1998 (JP) .......................................... 10-192189

(51) Int. Cl.$^7$ ................................................ G06K 7/00
(52) U.S. Cl. .................... 382/312; 382/315; 250/201.8; 250/208.2
(58) Field of Search .................. 382/232, 312, 382/317, 315; 250/201.8, 208.2; 348/308

(56) References Cited

U.S. PATENT DOCUMENTS

| | | | |
|---|---|---|---|
| 4,835,404 A | 5/1989 | Sugawa et al. ............ 250/578 |
| 4,879,470 A | 11/1989 | Sugawa et al. ............ 250/578 |
| 4,926,251 A * | 5/1990 | Sekizawa et al. .......... 358/75 |
| 4,967,067 A | 10/1990 | Hashimoto et al. ....... 250/208.1 |
| 4,972,243 A | 11/1990 | Sugawa et al. ............ 357/30 |
| 5,162,912 A | 11/1992 | Ueno et al. ............. 358/213.16 |
| 5,184,006 A | 2/1993 | Ueno ..................... 250/208.1 |
| RE34,309 E | 7/1993 | Tanaka et al. .......... 358/213.31 |
| 5,241,167 A * | 8/1993 | Suzuki et al. ............ 250/201.8 |
| 5,262,870 A | 11/1993 | Nakamura et al. ........ 358/212 |
| 5,467,198 A * | 11/1995 | Aosaki et al. ............ 358/400 |
| 5,485,004 A * | 1/1996 | Suzuki et al. ............ 250/208.2 |
| 5,539,196 A | 7/1996 | Miyawaki et al. ....... 250/208.1 |
| 5,625,718 A * | 4/1997 | Kaji et al. ................ 382/274 |
| 5,663,569 A * | 9/1997 | Hayano ................. 250/559.45 |
| 5,693,932 A | 12/1997 | Ueno et al. ............. 250/208.1 |
| 5,714,752 A | 2/1998 | Ueno et al. ............. 250/208.1 |
| 6,005,680 A * | 12/1999 | Luther et al. ............. 358/456 |
| 6,188,806 B1 * | 2/2001 | Inatome et al. .......... 382/312 |

* cited by examiner

Primary Examiner—Anh Hong Do
(74) Attorney, Agent, or Firm—Fitzpatrick, Cella, Harper & Scinto

(57) ABSTRACT

Control to read signals from a sensor unit having a plurality of pixels by pixel blocks of a predetermined size, and the read signals are applied a sum of products operation by pixel blocks of the predetermined size. The calculated sum of products is applied to signal processes, such as signal compression, performed by a block.

12 Claims, 30 Drawing Sheets

PRIOR ART  FIG. 3
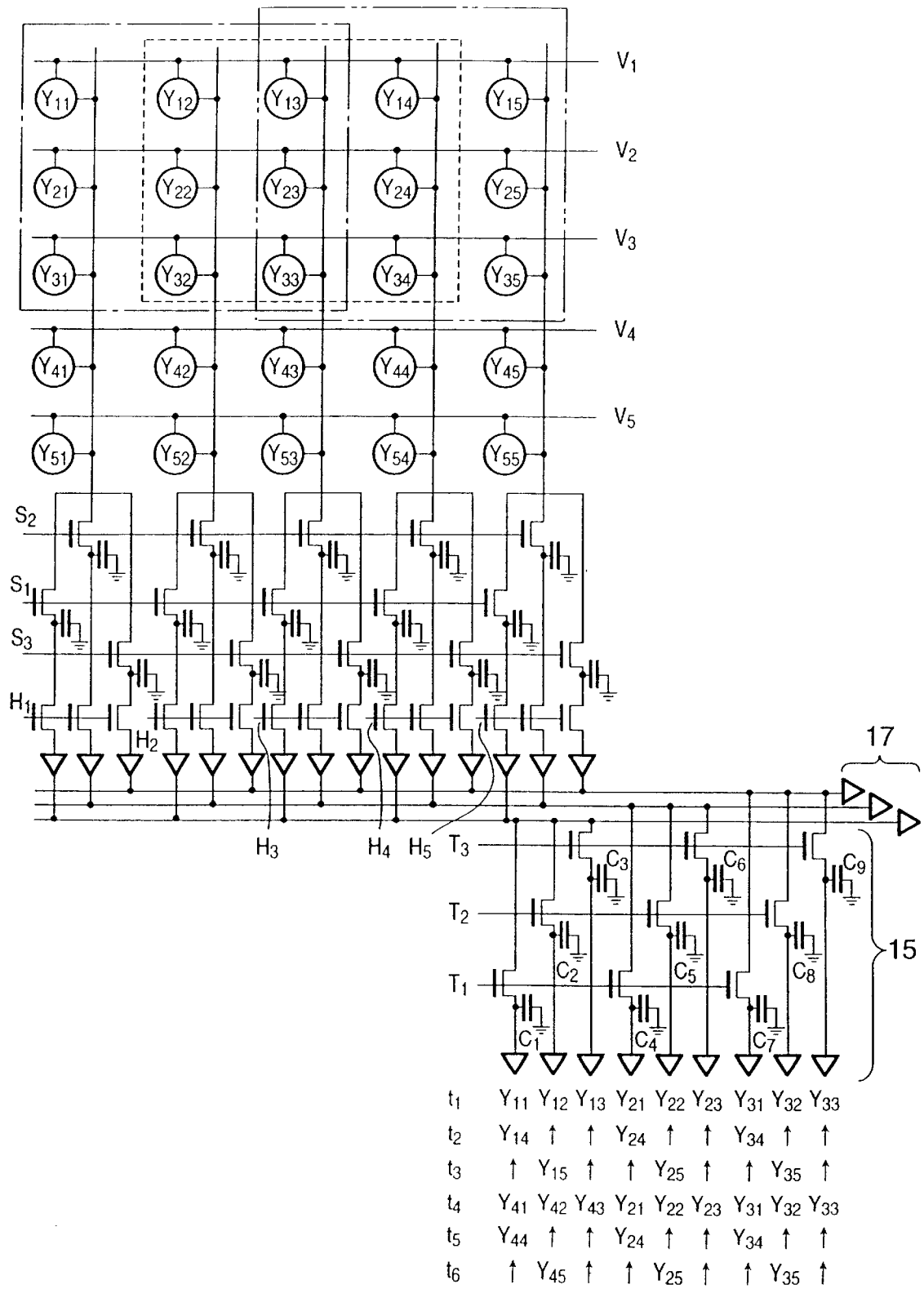

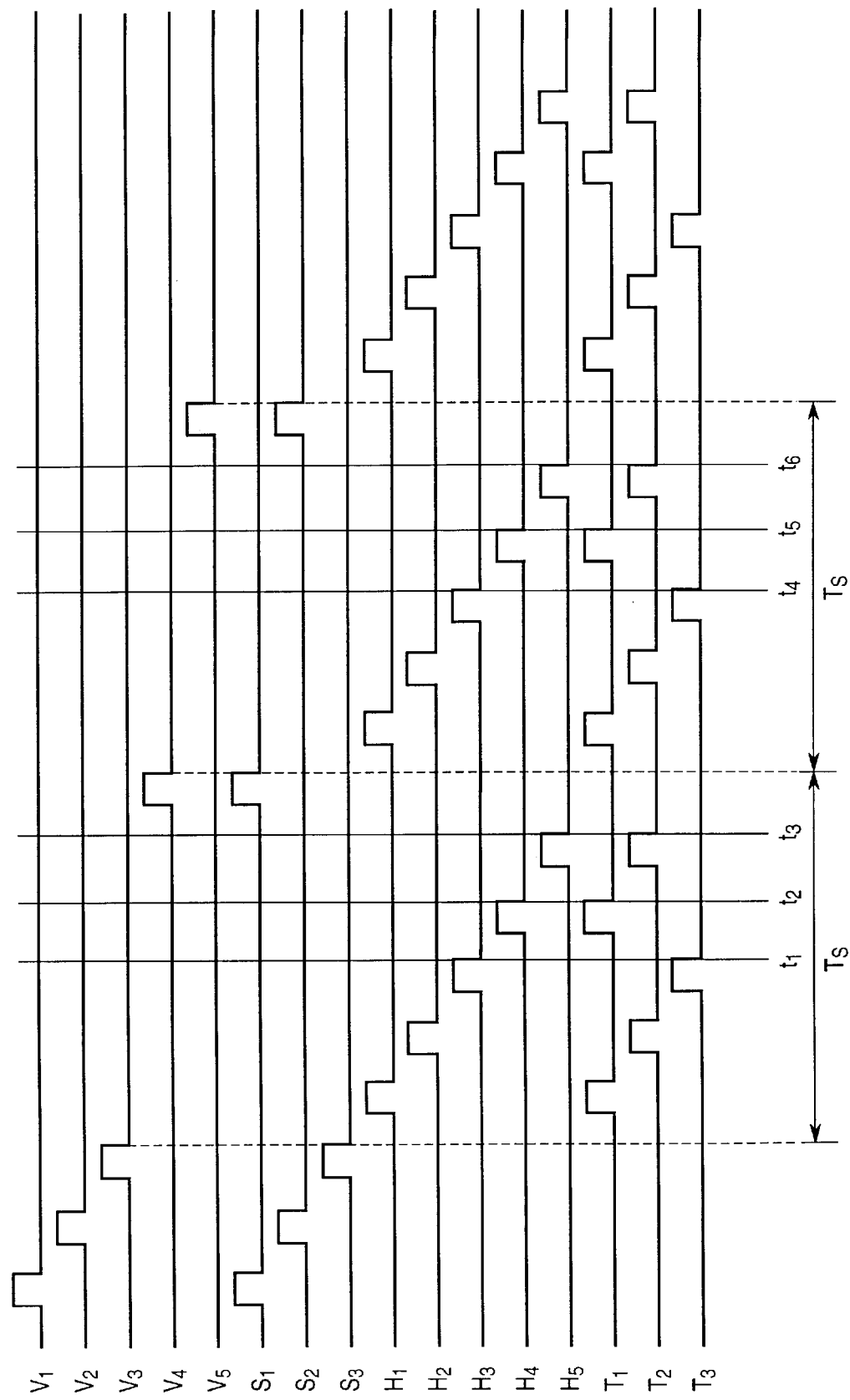

OUT

FIG. 14A
SENSOR UNIT, BLOCK(4×4)
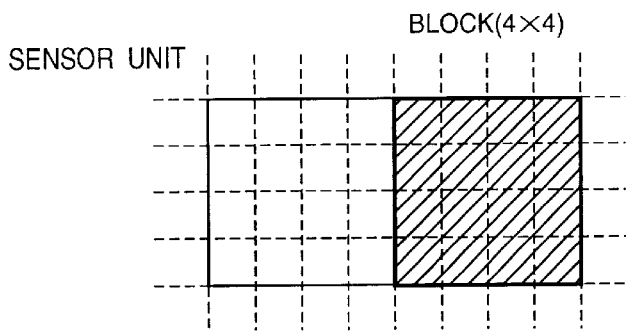
FIG. 14B
EXAMPLE OF WEIGHTING COEFFICIENTS
| 1 | 1 | 1 | 1 |
|---|---|---|---|
| 1 | 1 | 1 | 1 |
| 1 | 1 | 1 | 1 |
| 1 | 1 | 1 | 1 |
FIG. 14C
CANDIDATE CODES
VECTOR QUANTIZATION CODES
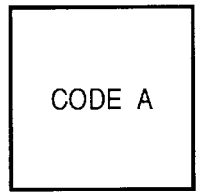 CODE A 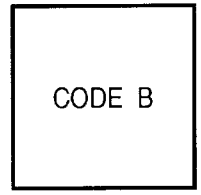 CODE B 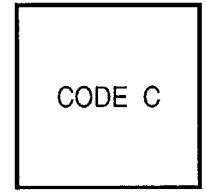 CODE C
FIG. 15A
SENSOR UNIT, ADJOINING PIXELS, ADJOINING PIXELS
FIG. 15B
EXAMPLE OF WEIGHTING COEFFICIENTS
| 0 | 1 | 1 | 1 | 1 | 0 |
|---|---|---|---|---|---|
| 1 | 0 | 0 | 0 | 0 | 1 |
| 1 | 0 | 0 | 0 | 0 | 1 |
| 1 | 0 | 0 | 0 | 0 | 1 |
| 1 | 0 | 0 | 0 | 0 | 1 |
| 0 | 1 | 1 | 1 | 1 | 0 |
FIG. 15C
VECTOR QUANTIZATION CODES
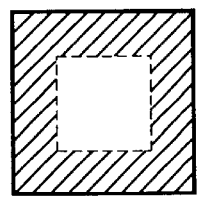

FIG. 22A

| $\alpha_{-1,-1}$ | $\alpha_{-1,0}$ | $\alpha_{-1,1}$ |
|---|---|---|
| $\alpha_{0,-1}$ | $\alpha_{0,0}$ | $\alpha_{0,1}$ |
| $\alpha_{1,-1}$ | $\alpha_{1,0}$ | $\alpha_{1,1}$ |

FIG. 22B

| 1/9 | 1/9 | 1/9 |
|---|---|---|
| 1/9 | 1/9 | 1/9 |
| 1/9 | 1/9 | 1/9 |

FIG. 22C

| −1 | 0 | 1 |
|---|---|---|
| −1 | 0 | 1 |
| −1 | 0 | 1 |

FIG. 22D

| 1 | 1 | 1 |
|---|---|---|
| 1 | −8 | 1 |
| 1 | 1 | 1 |

IMAGE SENSING DEVICE CAPABLE OF OUTPUTTING IMAGE SIGNALS BY BLOCKS AND PROCESSING CIRCUIT WHICH PROCESSES IMAGE SIGNALS BY BLOCKS

BACKGROUND OF THE INVENTION

The present invention relates to an image sensor, an image signal processing method, an image signal processing system, and an image sensing apparatus.

In an image signal processing circuit which deals with color signals, variety of image signal processes are usually performed. Generally, in the image signal processes, signals are processed by pixel blocks of a predetermined size.

There are various kinds of image signal processes which are performed by pixel blocks of the predetermined size, and summation of differences between adjoining pixels, summation of weighted signals of pixels in the pixel block, and filtering, for instance, are included in such image signal processes.

A conventional image sensing apparatus which performs filtering operation by pixel blocks is explained with reference to FIG. 33.

FIG. 33 is a block diagram illustrating a configuration of the conventional image sensing apparatus. In FIG. 33, reference numeral 901 denotes a charge-coupled device (CCD) image sensor; 902, an analog-digital (A/D) converter; 903, memory; 904, a spatial filter; 905, a digital-analog (D/A) converter.

In the CCD image sensor 901, a photoelectric signal obtained in each photoelectric conversion element of the image sensor 901 is first transmitted in the vertical direction, then in the horizontal direction. More specifically, after all the photoelectric signals in a given row are transferred in the vertical direction and arrive at a horizontal transfer unit, the photoelectric signals of the given row are transferred in the horizontal direction by the horizontal transfer unit and sequentially outputted from an output terminal. The above operation is performed for every row. Therefore, photoelectric signals of pixels of the image sensor 901 are sequentially outputted in the scanning order as shown by solid arrows in the image sensor 901 in FIG. 33.

The photoelectric signals outputted from the image sensor 901 are converted into digital signals by the A/D converter 902, then stored in the memory 903. Thereafter, digital signals corresponding to, e.g., 3×3 pixel area (i.e., block) are outputted from the memory 903 and enter the spatial filter 904. The spatial filter 904 performs filtering processes using, e.g., a low-pass filter and a band-pass filter on the inputted digital signals, then outputs the filtered signals. The D/A converter 905 performs digital-analog conversion on the filtered signals and outputs analog image signals.

Thus, image signal processes, such as the filtering operation as described above, are conventionally performed on photoelectric signals (pixel signals) which are serially outputted from an image sensor to a signal processing circuit. Therefore, in order to process the signals by pixel blocks, the signal processing circuit has to wait until all the pixel signals are outputted from the image sensor.

Further, memory is needed for processing pixel signals by pixel blocks, and the memory required in this operation should have a large capacity.

More specifically, in the image sensing apparatus performing the filtering operation as described above, for instance, it is necessary to store pixel signals in the memory 903 for providing the pixel signals by pixel blocks to the spatial filter 904. In a case where the spatial filter 904 processes signals by the 3×3 pixel block, the memory 904 needs to have a capacity to store signals of two rows. In this case, an image signal outputted from the spatial filter 904 is lagging by one row behind a pixel signal outputted from the image sensor 901. In addition, there is a delay since photoelectric signals are obtained in the respective pixels until the photoelectric signals are actually outputted from the image sensor 901 after being transferred within the image sensor 901.

Further, in the aforesaid conventional image sensing apparatus, it is necessary to have an IC chip, including the A/D converter 902, the memory 903, the spatial filter 904, and the D/A converter 905 separately an IC chip of the image sensor 901.

Therefore, neither good cost performance nor the high-speed image signal processing can be expected when a variety of image signal processes are to be performed in the conventional signal processing circuit.

SUMMARY OF THE INVENTION

The present invention has been made in consideration of the above situation, and has as its object to provide an image sensing device, an image sensing apparatus, and an image signal reading and processing method capable of simplifying a configuration of a signal processing circuit which calculates sum of products or performs spatial filtering processing on image signals by blocks, thereby improving processing speed in the signal processing circuit.

According to the present invention, the foregoing object is attained by providing an image sensing device comprising: a sensor unit having a plurality of pixels; control means for controlling to read signals from the sensor unit by pixel blocks of a predetermined size; and signal processing means for calculating sum information of the signals, read from the sensor unit, by pixel blocks of the predetermined size.

Further, the foregoing object is also attained by providing an image sensing apparatus comprising: a sensor unit having a plurality of pixels; control means for controlling to read signals from the sensor unit by pixel blocks of a predetermined size; signal processing means for calculating sum information of the signals, read from the sensor unit, by pixel blocks of the predetermined size; and compression means for compressing the sum information calculated by the signal processing means.

Furthermore, the foregoing object is also attained by providing an image signal reading and processing method comprising: a reading step of reading signals of a plurality of pixels by pixel blocks of a predetermined size; and a signal processing step of calculating sum information of the signals read by pixel blocks of the predetermined size in the reading step.

Further, the foregoing object is also attained by providing an image sensing device comprising: a sensor unit having a plurality of pixels; control means for controlling to read signals from the sensor unit by pixel blocks of a predetermined size; and a spatial filter for performing spatial filtering on the signals, read from the sensor unit, by pixel blocks of the predetermined size.

Further, the foregoing object is also attained by providing an image signal reading and processing method comprising: a reading step of reading signals of a plurality of pixels by pixel blocks of a predetermined size; and a spatial filtering step of performing spatial filtering on the signals, read in the reading step, by pixel blocks of the predetermined size.

Further, it is another object of the present invention to provide an image sensing device and an image signal reading method capable of reading image signals in the optimum condition for being processed with signal processes by blocks.

According to the present invention, the foregoing object is attained by providing an image sensing device comprising: a sensor unit having a plurality of pixels; vertical selection means for selecting pixels of the sensor unit by a row; horizontal selection means for selecting pixels of the sensor unit by a column; and output means for outputting signals from pixels which are selected by both of the vertical selection means and the horizontal selection means.

Further, the foregoing object is also attained by providing a reading method for reading signals from a sensor unit having a plurality of pixels, the method comprising: a vertical selection step of selecting pixels of the sensor unit by a row; a horizontal selection step of selecting pixels of the sensor unit by a column; and an output step of outputting signals from pixels which are selected in both of the vertical selection step and the horizontal selection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram for showing a circuit configuration of an image signal processing unit according to the first embodiment of the present invention;

FIG. 4 is a timing chart showing operational timing of signals to be applied to the circuit shown in FIG. 3;

FIGS. 14A to 14C are explanatory views for explaining the principle of data compression in code book method;

FIGS. 15A to 15C are explanatory views for explaining the principle of the data compression in the code book method;

FIGS. 22A to 22D show examples of filter coefficients used in the spatial filter shown in FIG. 21;

DETAILED DESCRIPTION OF THE PREFERRED EMBODIMENTS

Preferred embodiments of the present invention will be described in detail below in accordance with the accompanying drawings.

<First Embodiment>

Figure 1:
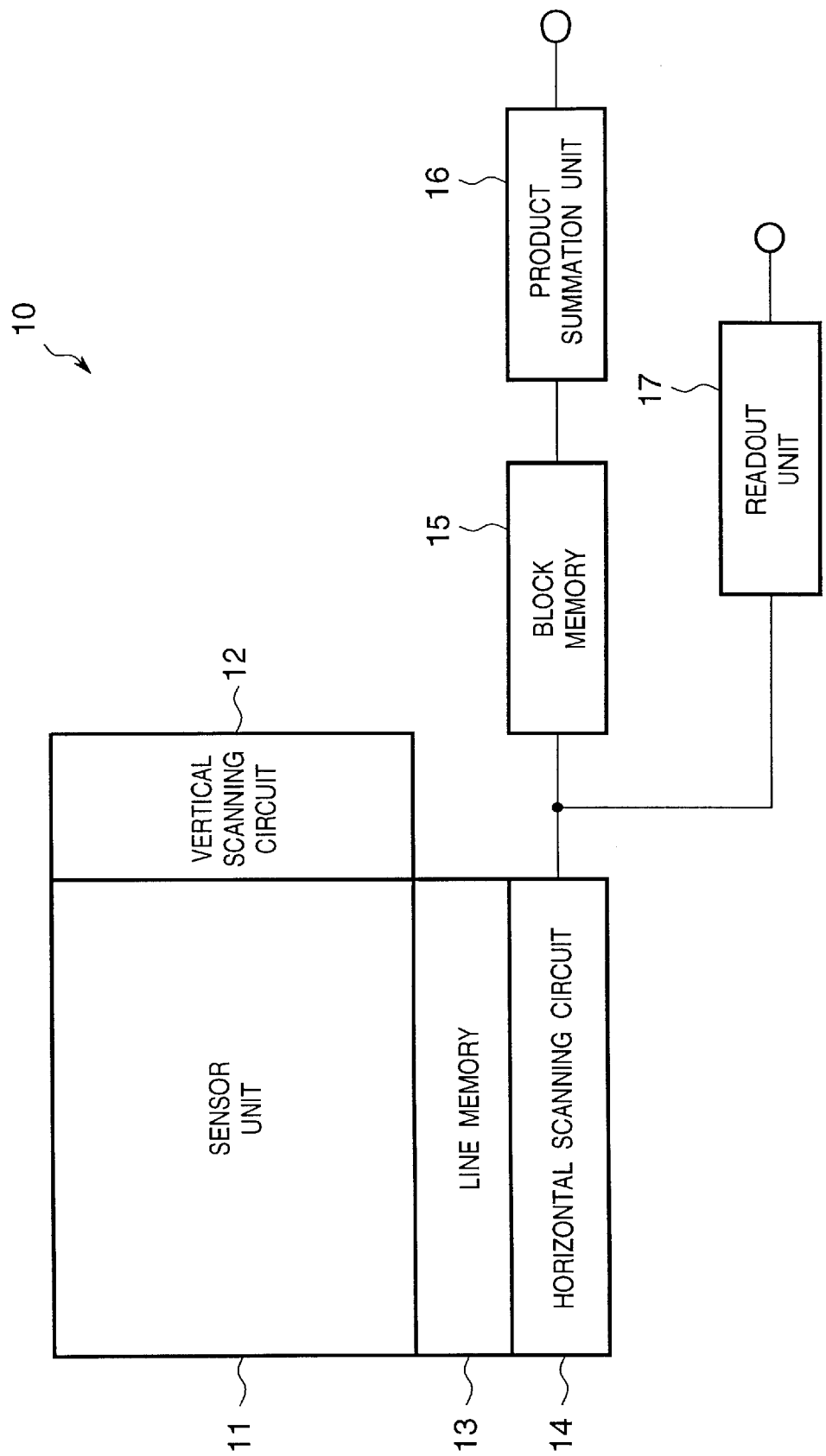
FIG. 1 is a block diagram illustrating an image sensing device according to a first embodiment of the present invention.

FIG. 1 is a block diagram illustrating a configuration of an image sensing device 10 according to the first embodiment of the present invention. Referring to FIG. 1, the image sensing device 10 comprises a sensor unit 11, a vertical scanning circuit 12, line memory 13, a horizontal scanning circuit 14, block memory 15, a sum of products calculation unit 16, and a readout unit 17, all of which are integrally configured on a single IC chip. The block memory 15 and the sum of products calculation unit 16 configures an image signal processing unit.

Figure 2A:
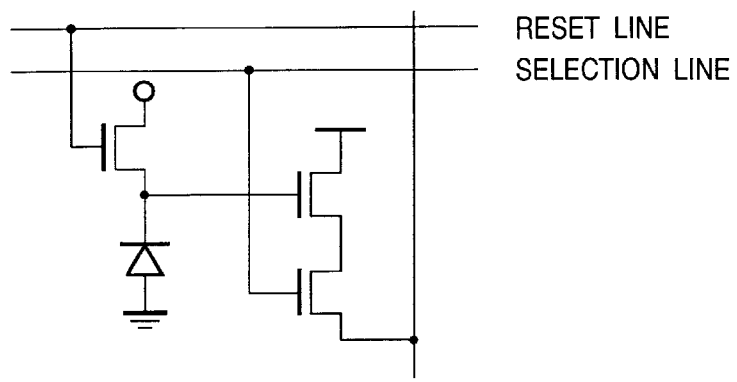
FIGS. 2A to 2C are circuit diagrams illustrating configurations of a pixel.
Figure 2B:
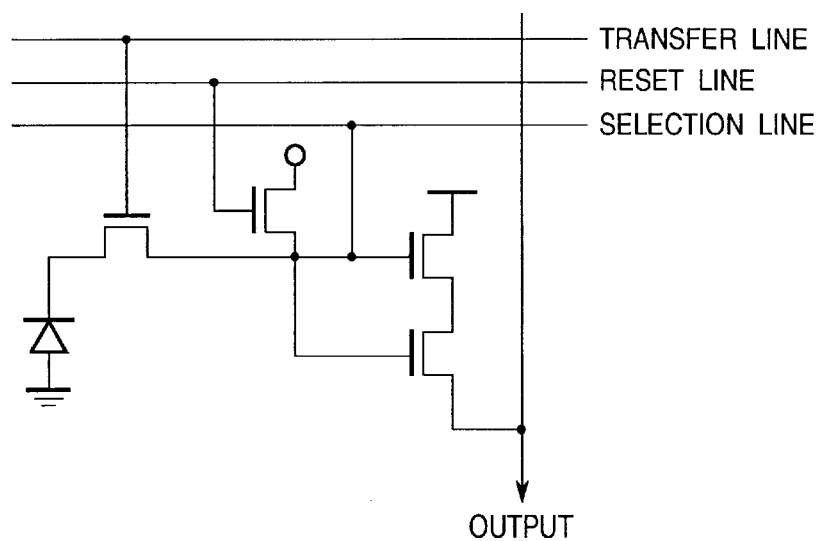
Figure 2C:
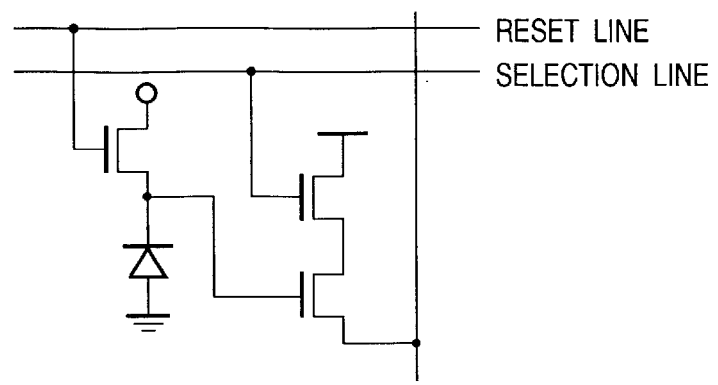

In the sensor unit 11, a plurality of cells (pixels), each has a configuration as shown in FIG. 2A, 2B or 2C, are arranged both in the horizontal and vertical directions. Further, complementary color filters of cyan (C), yellow (Y), magenta (M) and green (G) are provided over photodiodes of the respective pixels, and raw image signals of yellow (Ye), cyan (Cy), magenta (Mg), and green (Gr) are serially outputted from the sensor unit 11. Note, each pixel is reset by controlling a signal of a reset line, and selection of a pixel is performed by controlling a signal of a selection line. Further, in the configuration as shown in FIG. 2B, a photoelectric signal is transferred to an amplifier when a signal of a transfer line is controlled to high.

The raw Ye, Cy, Mg and Gr signals (pixel signals) outputted from the sensor unit 11 enter the block memory 15. The block memory 15 outputs the pixel signals by blocks of a predetermined size, smaller than a frame, which is suitable for various signal processes (e.g., compression) to be performed in an image processing apparatus that may be connected to the image sensing device 10.

Further, from the readout unit 17, signals are outputted by each pixel. The readout unit 17 may be provided after the block memory 15 in parallel with the sum of products calculation unit 16.

The sum of products calculation unit 16 performs matrix operation on the pixel signals stored in the block memory 15. More specifically, when a compression circuit which performs code-book compression is connected to the image sensing device 10, for instance, the sum of products calculation unit 16 calculates the average luminance of the pixel signals or the sum of weighted signal values by blocks of the predetermined size which is the same size as a compression code matrix. The sum of the weighted signal values of each block is referred to as "sum information" hereinafter. Note, a weighting coefficient may be a negative value.

FIG. 3 is a diagram for showing a circuit configuration of the block memory 15 and the sum of products calculation unit 16, and FIG. 4 is a timing chart showing operational timing of signals to be applied to the circuit shown in FIG. 3. The circuit shown in FIG. 3 is configured so as to output signals by blocks of 3×3 (=9) pixels, as shown by dot-dash line, dash line, and two-dot-dash line in FIG. 3, in parallel.

After pixel signals are read from the pixels in a 3×3 pixel block, pixel signals in the next 3×3 pixel block which is at a position where the previous block is shifted by a pixel in the horizontal direction are read. Therefore, in this manner, a signal of each pixel is read three times. Although the detailed explanation of reading operation is omitted, signals of pixels $Y_{11}$, $Y_{12}$, $Y_{13}$, $Y_{21}$, $Y_{22}$, $Y_{23}$, $Y_{31}$, $Y_{32}$ and $Y_{33}$ (surrounded by a dot-dash line) are outputted at time $t_1$, when horizontal scan signals $H_1$ to $H_5$, vertical scan signals $V_1$ to $V_5$, shift signals $S_1$ to $S_3$, and selection signals $T_1$ to $T_3$ are controlled as shown in FIG. 4.

These nine pixel signals are stored in condensers, i.e., memory, $C_1$ to $C_9$, respectively. Then, at time $t_2$, signals of 3×3 pixels in the next block which is at a position where the previous block is shifted by a pixel in the horizontal direction are outputted in parallel. Accordingly, signals of pixels $Y_{12}$, $Y_{13}$, $Y_{14}$, $Y_{22}$, $Y_{23}$, $Y_{24}$, $Y_{32}$, $Y_{33}$ and $Y_{34}$ (surrounded by a dash line) are outputted.

At time $t_2$, in this case, the signals which were not outputted at time $t_1$ are signals of three pixels $Y_{14}$, $Y_{24}$ and $Y_{34}$, and the other six signals of the pixels $Y_{12}$, $Y_{13}$, $Y_{22}$, $Y_{23}$, $Y_{32}$ and $Y_{33}$ have been outputted at time t1. Therefore, instead of reading the signals of the previously read pixels again, the pixel signals stored in the condenser $C_2$, $C_3$, $C_5$, $C_6$, $C_8$ and $C_9$ are outputted. In this manner, pixel signals are read by blocks while the position of the block is shifted one pixel in the horizontal direction. For reading all the pixel signals from 5×5 pixel frame, as shown in FIG. 3, by the 3×3 pixel block, the pixel signals in the first three rows, i.e., first second and third rows are read at time t1 to t3 (in a period Ts) while shifting the position of the block in the horizontal direction, then, the pixel signals in the second, third and fourth rows are read at time t4 to t6 (also in a period Ts) while shifting the position for the block in the horizontal direction, finally, the pixel signals in the third, fourth and fifth rows are read in the similar manner. At the same time, signals are outputted from the image sensing device 10 by pixel via the readout unit 17. It should noted that FIG. 3 shows a case of reading signals from 5×5 pixel frame for explanatory sake, however, practically a greater number pixels are arranged.

Figure 5:
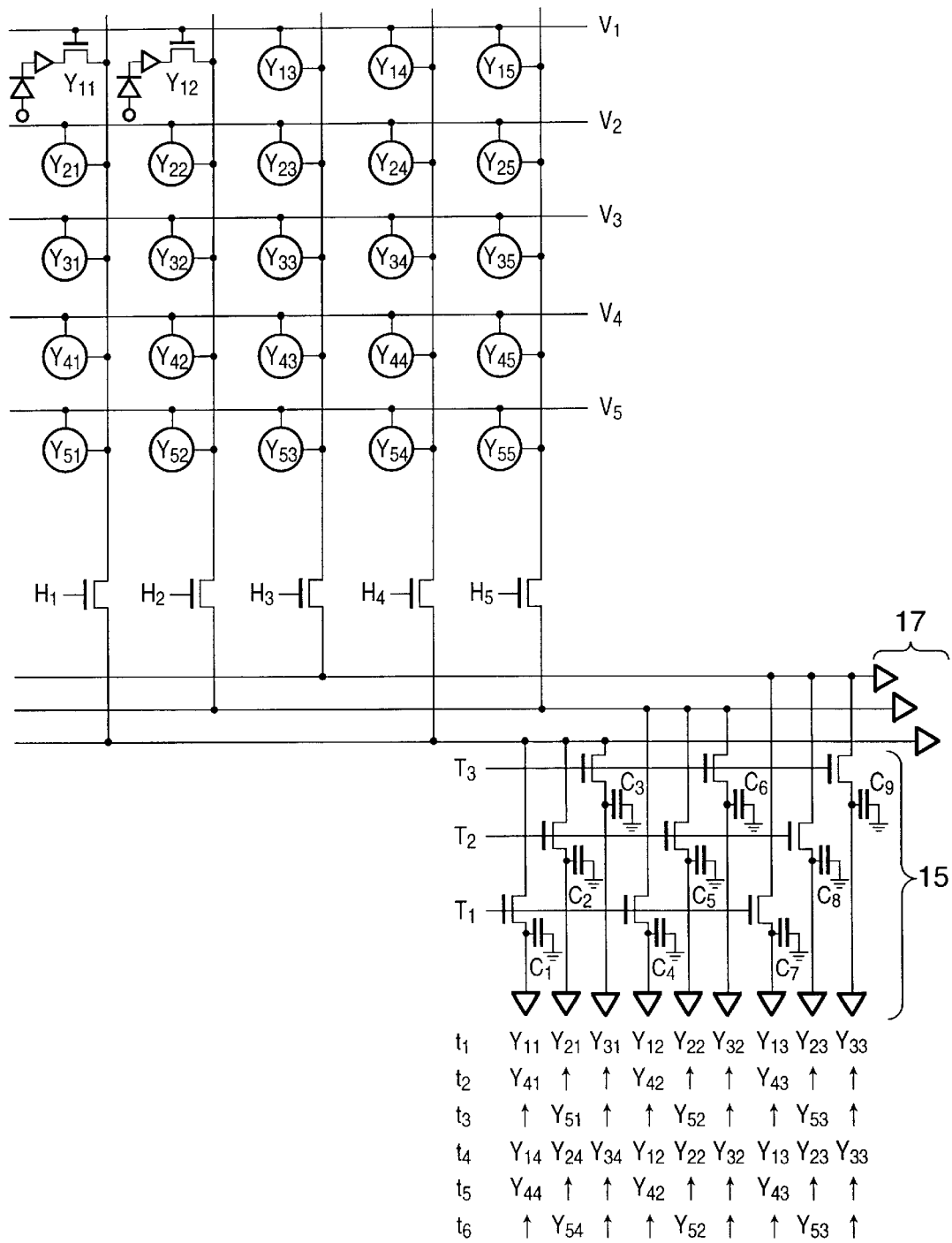
FIG. 5 is a diagram for showing another circuit configuration of an image signal processing unit according to the first embodiment of the present invention.
Figure 6:
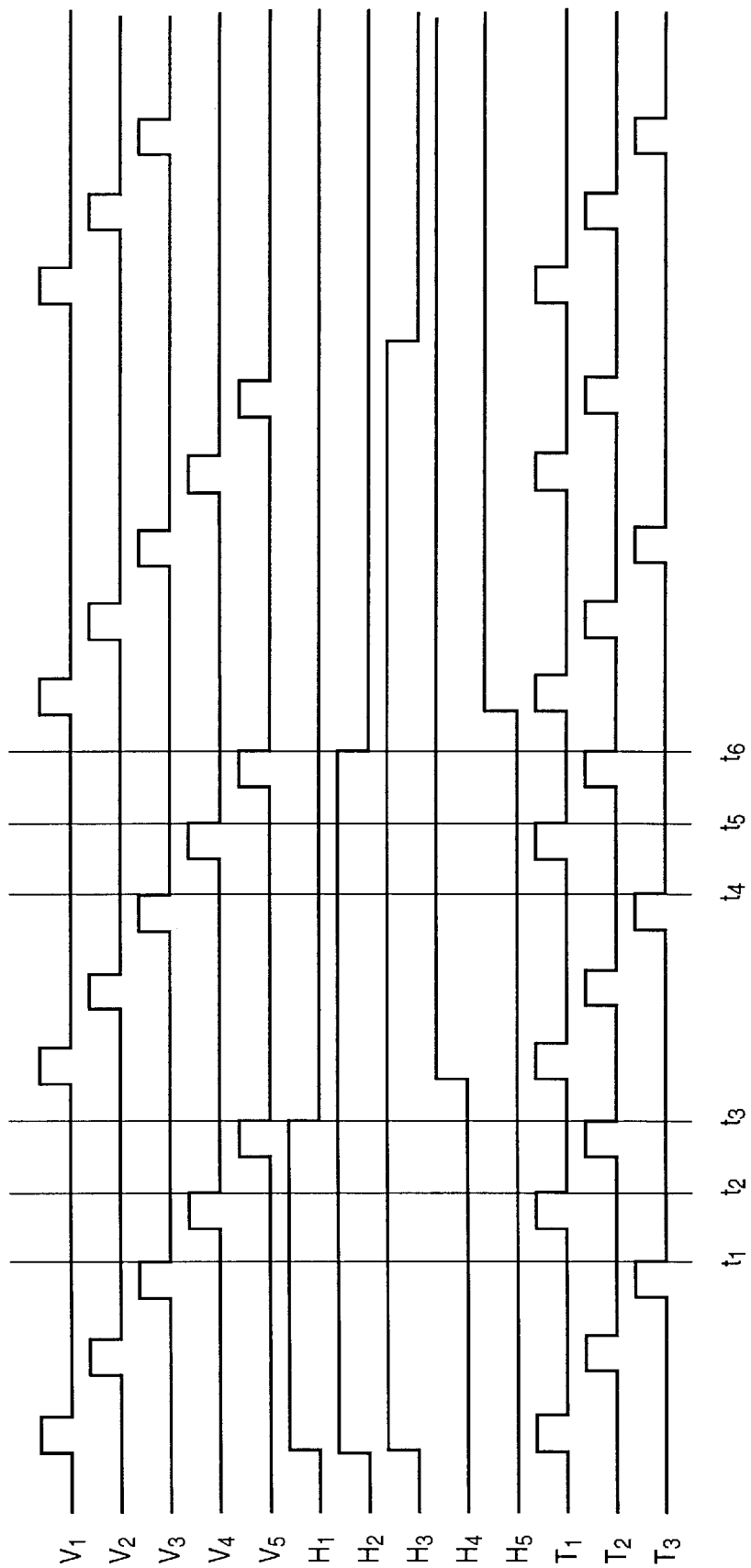
FIG. 6 is a timing chart showing operational timing of signals to be applied to the circuit shown in FIG. 5.

FIG. 5 is a diagram for showing another circuit configuration of the block memory 15 and the sum of products calculation unit 16, in which the position of the 3×3 pixel block is shifted in the vertical direction by a pixel while reading pixel signals at each position. Since a signal is read out a plurality of times from each pixel, an amplifier is provided for each pixel. Further, FIG. 6 is a timing chart showing operational timing of signals to be applied to the circuit shown in FIG. 5.

Figure 7:
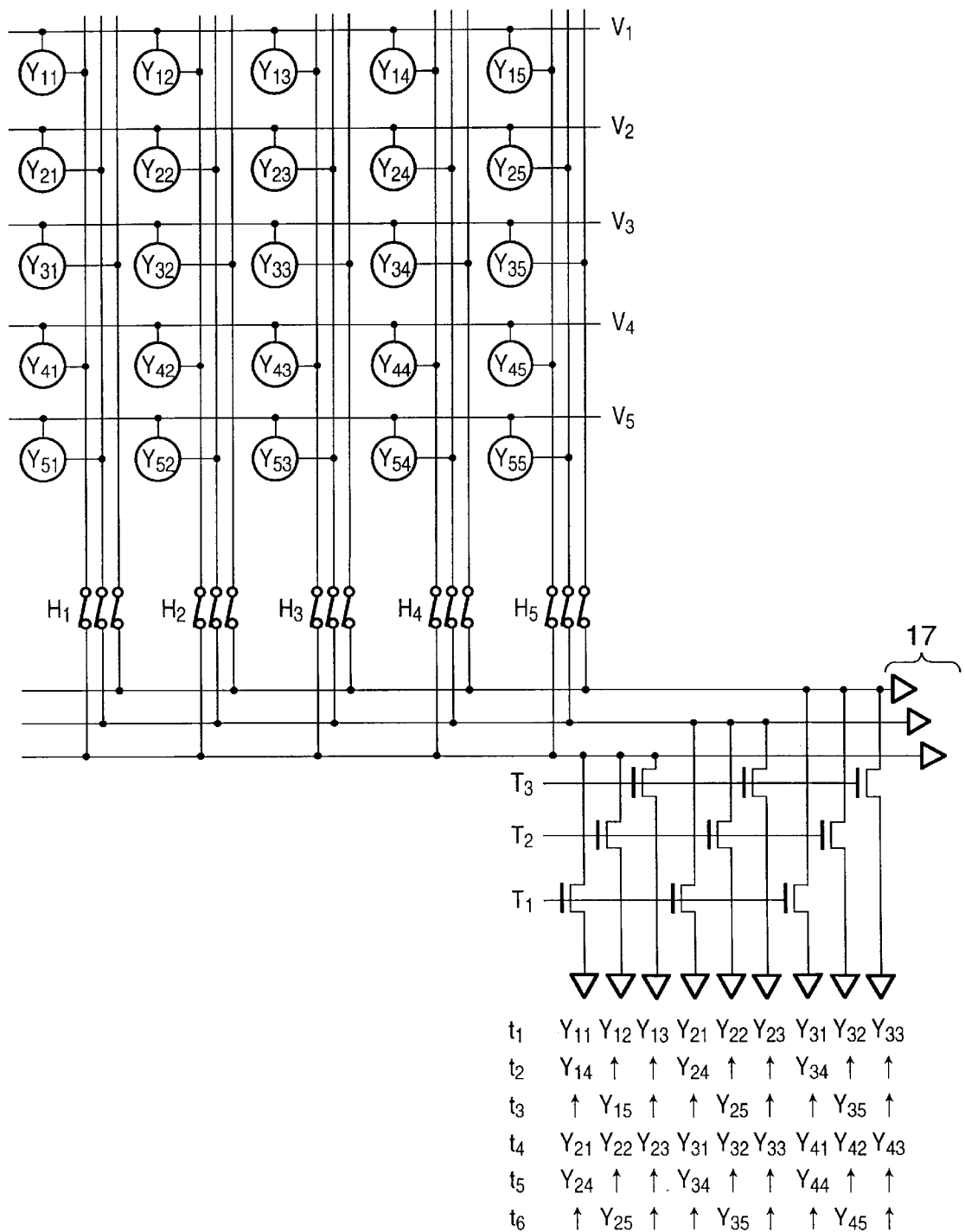
FIG. 7 is a diagram for showing another circuit configuration of an image signal processing unit according to the first embodiment of the present invention.
Figure 8:
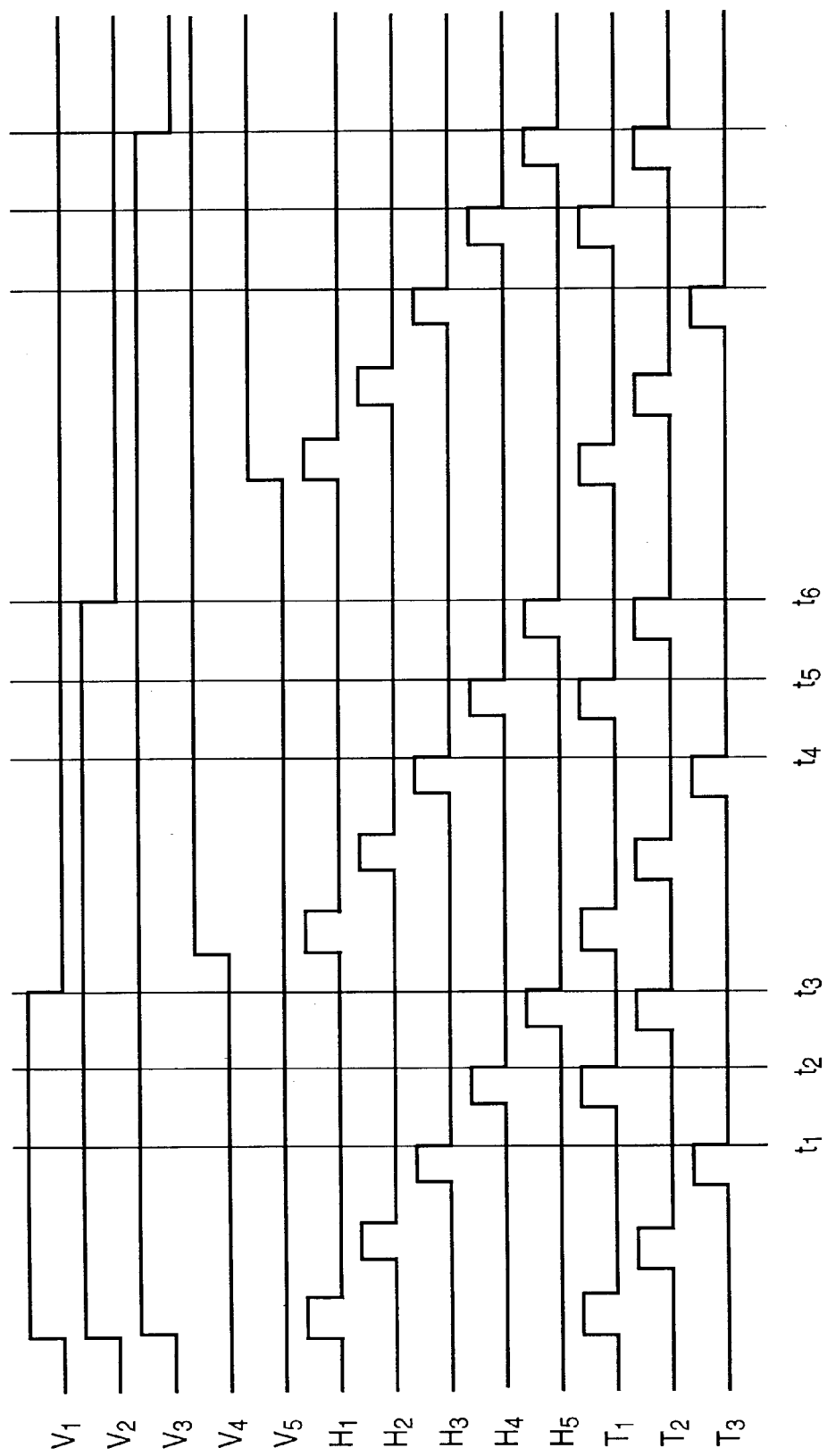
FIG. 8 is a timing chart showing operational timing of signals to be applied to the circuit shown in FIG. 7.

Further, FIG. 7 is a diagram for showing another circuit configuration of the block memory 15 and the sum of products calculation unit 16, in which three vertical output lines are provided at every interval between vertical pixel lines. Further, FIG. 8 is a timing chart showing operational timing of signals to be applied to the circuit shown in FIG. 7. In this case, the position of the block is shifted in the horizontal direction.

Figure 9:
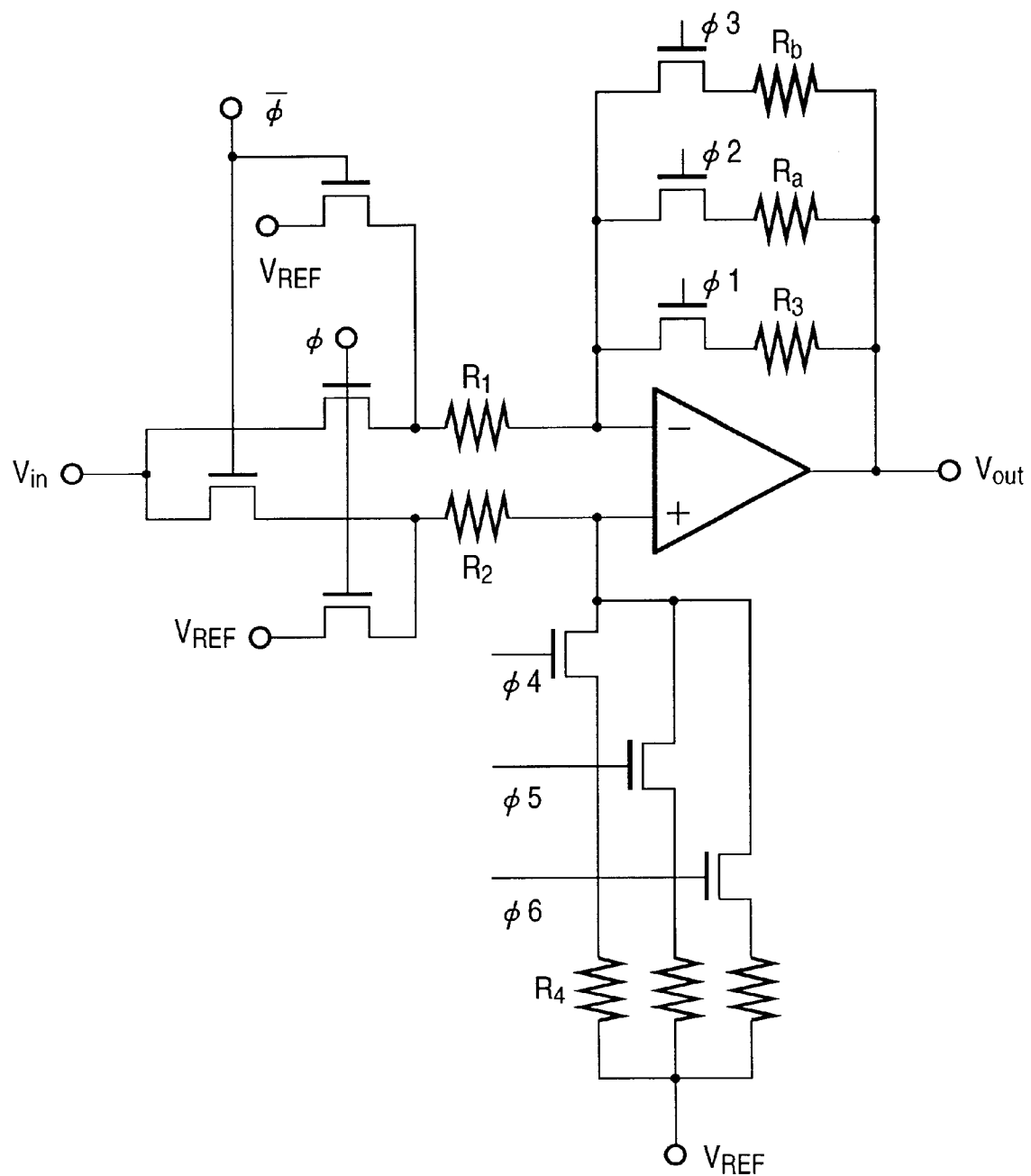
FIG. 9 is a diagram illustrating a circuit configuration of a sum of products calculation unit for weighting according to the first embodiment of the present invention.

Next, examples of weighting circuits, as examples of sum of products calculation unit 16, are explained with reference to FIGS. 9 to 13. An output voltage, Vout, from the circuit shown in FIG. 9 is, $$V_{out} = -(R_3/R_1)V_{in} + (R_1+R_3)V_{REF}/R_1.$$

Figure 10A:
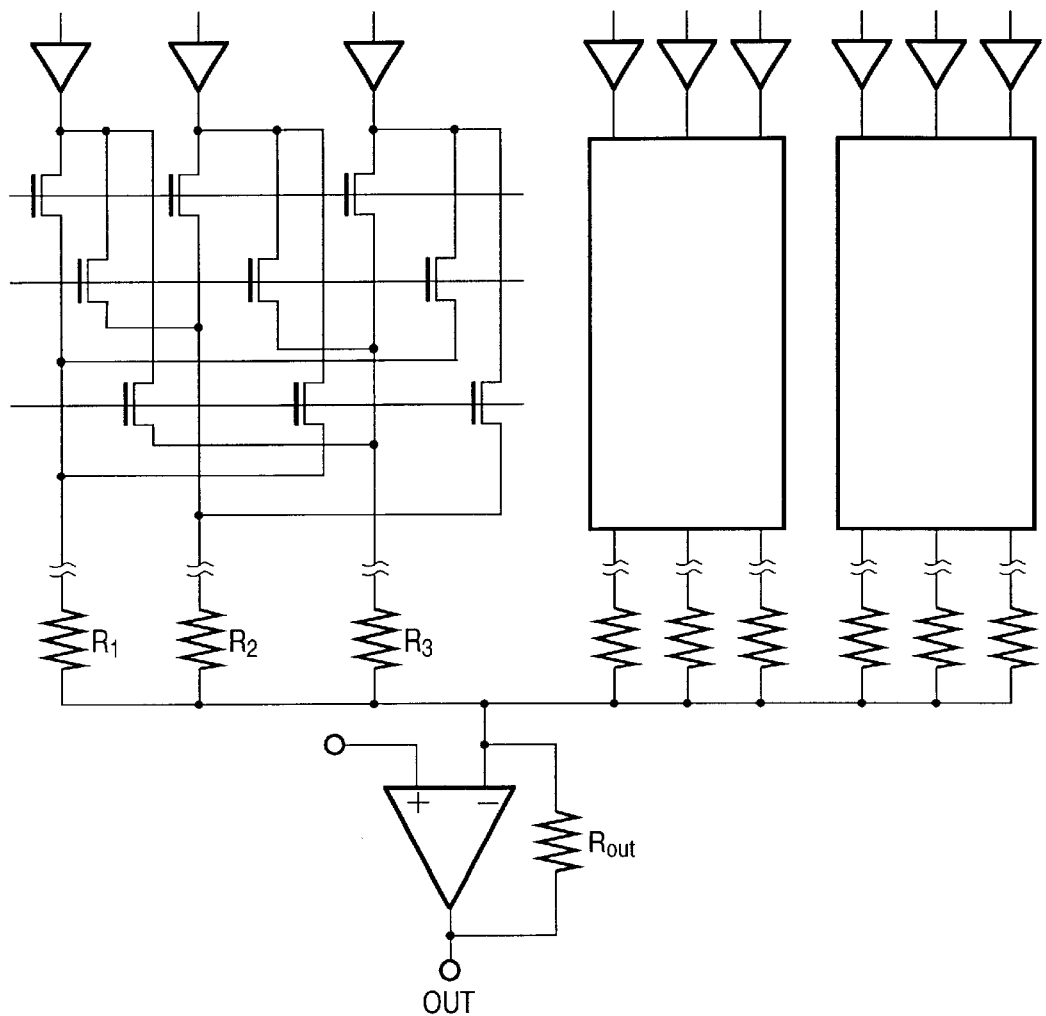
FIGS. 10A and 10B are diagrams illustrating other circuit configurations of the sum of products calculation unit for weighting according to the first embodiment of the present invention.
Figure 10B:
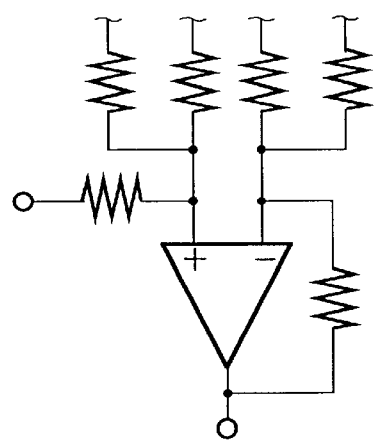

Further, in the weighting circuit as shown in FIG. 10A, a weight is controlled by changing ratios of resistance $R_1$, $R_2$ and $R_3$, which are connected to vertical output lines, to a feedback resistance $R_{out}$ connected across an amplifier. Further, for performing differential operation, the weighting circuit is configured to input pixel signals to positive and negative terminals of the amplifier as shown in FIG. 10B.

Figure 11:
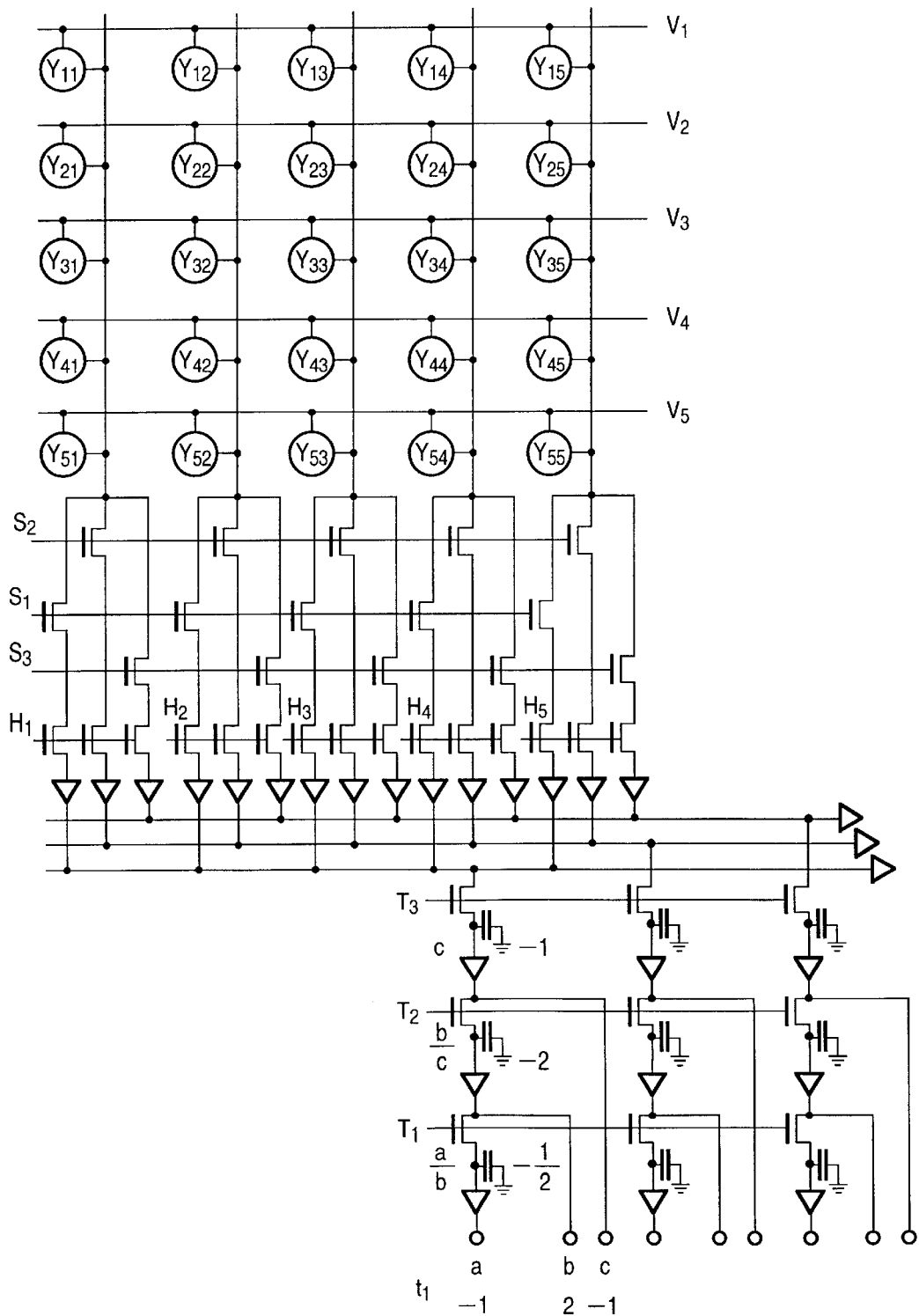
FIG. 11 is a diagram illustrating another circuit configuration of the sum of products calculation unit for weighting according to the first embodiment of the present invention.
Figure 12:
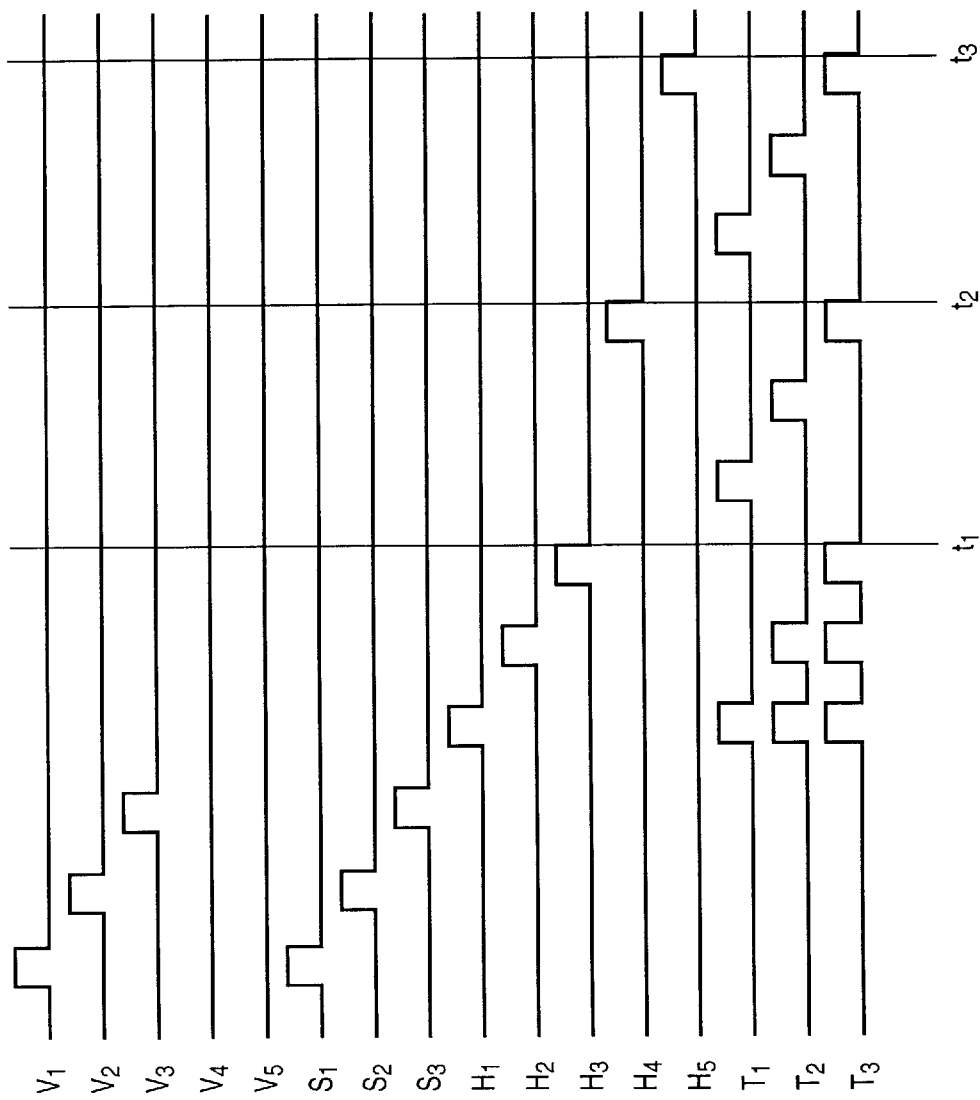
FIG. 12 is a timing chart showing operational timing of signals to be applied to the circuit shown in FIG. 11.

Further, it is possible to perform weighting operation by connecting operational amplifiers, having predetermined gains, to output terminals of the pixel signals in cascade connection. FIG. 11 shows an example of connecting amplifiers whose gains are −1, −2, and −½ in cascade connection, and FIG. 12 is a timing chart showing operational timing of signals to be applied to the circuit shown in FIG. 11.

In the configuration as shown in FIG. 11, the coefficient of an output from a terminal a at time $t_1$ after a pixel signal is processed by all of the three amplifiers is −1; the coefficient of an output from a terminal b at time $t_1$ processed by the first two amplifiers is 2; and the coefficient of an output from a terminal c at time $t_1$ processed by the first amplifier is −1.

Figure 13:
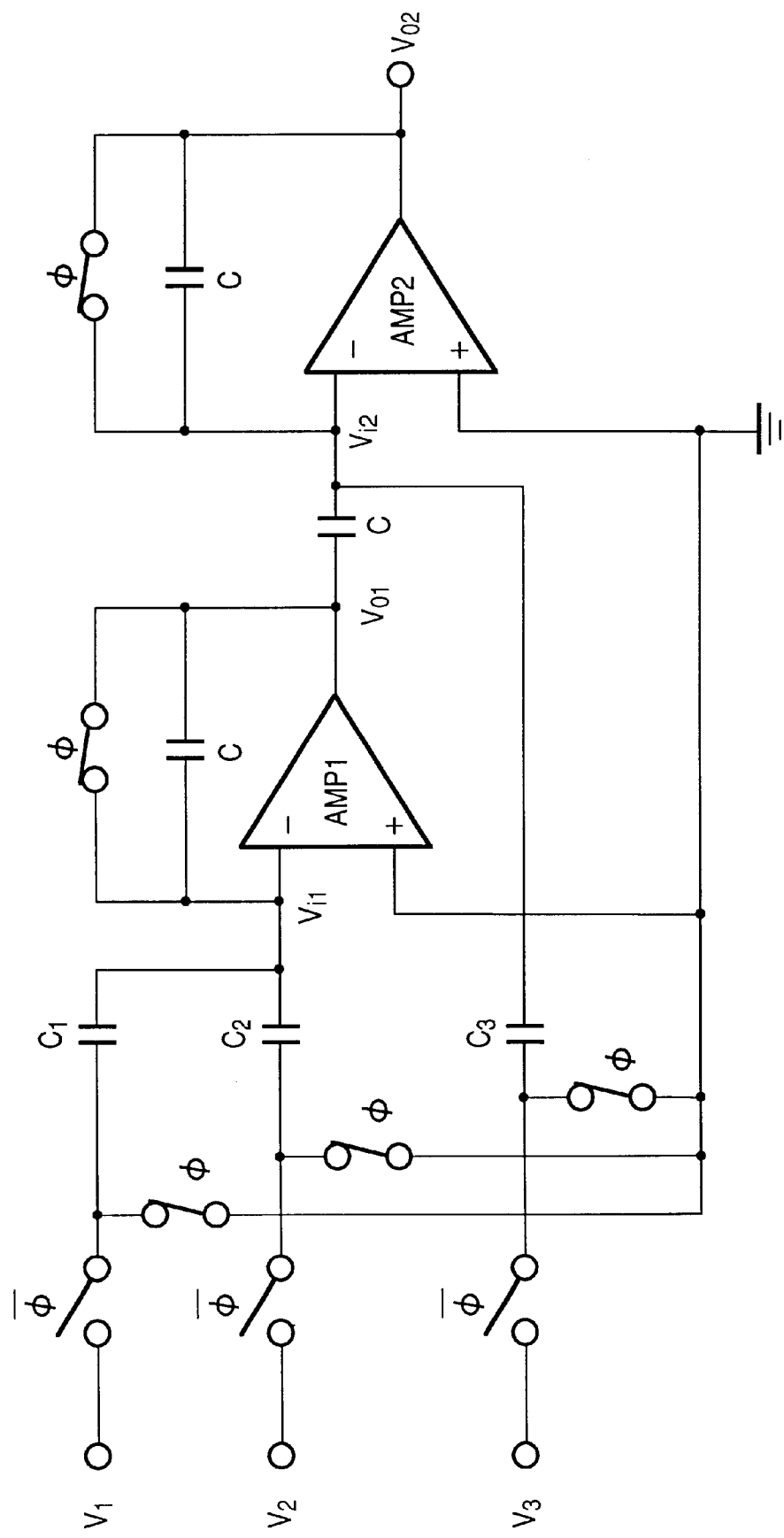
FIG. 13 is a diagram illustrating another circuit configuration of the sum of products calculation unit for weighting according to the first embodiment of the present invention.

FIG. 13 shows another example of a matrix operation circuit. In this example, $$C_1(V_1-V_{i1})+C_2(V_2-V_{i1})+C(V_{o1}-V_{i1})=0 \quad (1)$$

$$V_{o1}=AV_{i1} \quad (2)$$

where A is an open-loop gain of an operational amplifier AMP1.

When A goes to infinity, then, $$V_{i1}=0 \quad (3)$$

From the equations (1) and (3), $$C_1V_1+C_2V_2+CV_{o1}=0 \quad (4)$$

is obtained. By solving the equation (4) for $V_{o1}$, $$V_{o1}=(-C_1V_1-C_2V_2)/C \quad (5)$$

Further, $$C(V_{o1}-V_{i2})+C_3(V_3-V_{i2})+C(V_{o2}-V_{i2})=0 \quad (6)$$

As $V_{i2}$ approaches 0, by combining the equations (5) and (6), $$-C_1V_1-C_2V_2+C_3V_3+CV_{o2}=0 \quad (7)$$

is obtained. By solving the equation (7) for $V_{o2}$, the output from the matrix operation circuit shown in FIG. 13, namely, $V_{o2}$, is expressed by $$V_{o2}=(C_1V_1+C_2V_2-C_3V_3)/C \quad (8)$$

Next, an example of practical utilization of the output from the image sensing device 10 of the first embodiment is explained with reference to FIGS. 14A to 16. In this example, the output from the image sensing device 10 according to the first embodiment is provided to a compression/expansion apparatus adopting a code book method (vector quantization method).

Note, a case of outputting and processing pixel signals of a 3×3 pixel block is explained above with reference to FIGS. 3 to 13, for the sake of explanatory convenience; however, the size of the pixel block is not limited to 3×3, and below, since it is common to compress pixel signals by the 4×4 pixel block, a case of compressing pixel signals by the 4×4 pixel block is explained.

As shown in FIG. 14A, by calculating the sum of products of a 4×4 pixel block (weighting coefficients are 1 in this case (FIG. 14B)) as accumulated information, in advance, when performing compression or expansion of information by code book method, it is possible to narrow down vector quantization codes which may be used in code book compression to those having similar sums of products. In the case shown in FIG. 14C, three codes A, B and C, are selected from a code book. Accordingly, it is possible to search for vector quantization code to be used quickly and precisely.

More specifically, codes resembles to a pixel block to be encoded are selected from a code book using signals of the respective pixels, and when a plurality of codes of similar resemblance were selected, then codes are further selected out of the above selected codes on the basis of the sum information.

Thereafter, signals of pixels adjoining to the 6×6 pixel block are extracted and their average luminance is calculated (FIG. 15A). For this operation, weighting coefficients as shown in FIG. 15B is used. Then, for the respective candidate codes A, B and C, data corresponding to the aforesaid adjoining pixels are averaged ($\overline{A}, \overline{B}, \overline{C}$) (FIG. 15C), and compared to the average luminance. Thus, by acquiring the sum of products by blocks in the image sensing device, it is possible to perform compression/expansion in the code book method on the output signals from the image sensing device quickly and precisely.

Figure 16:
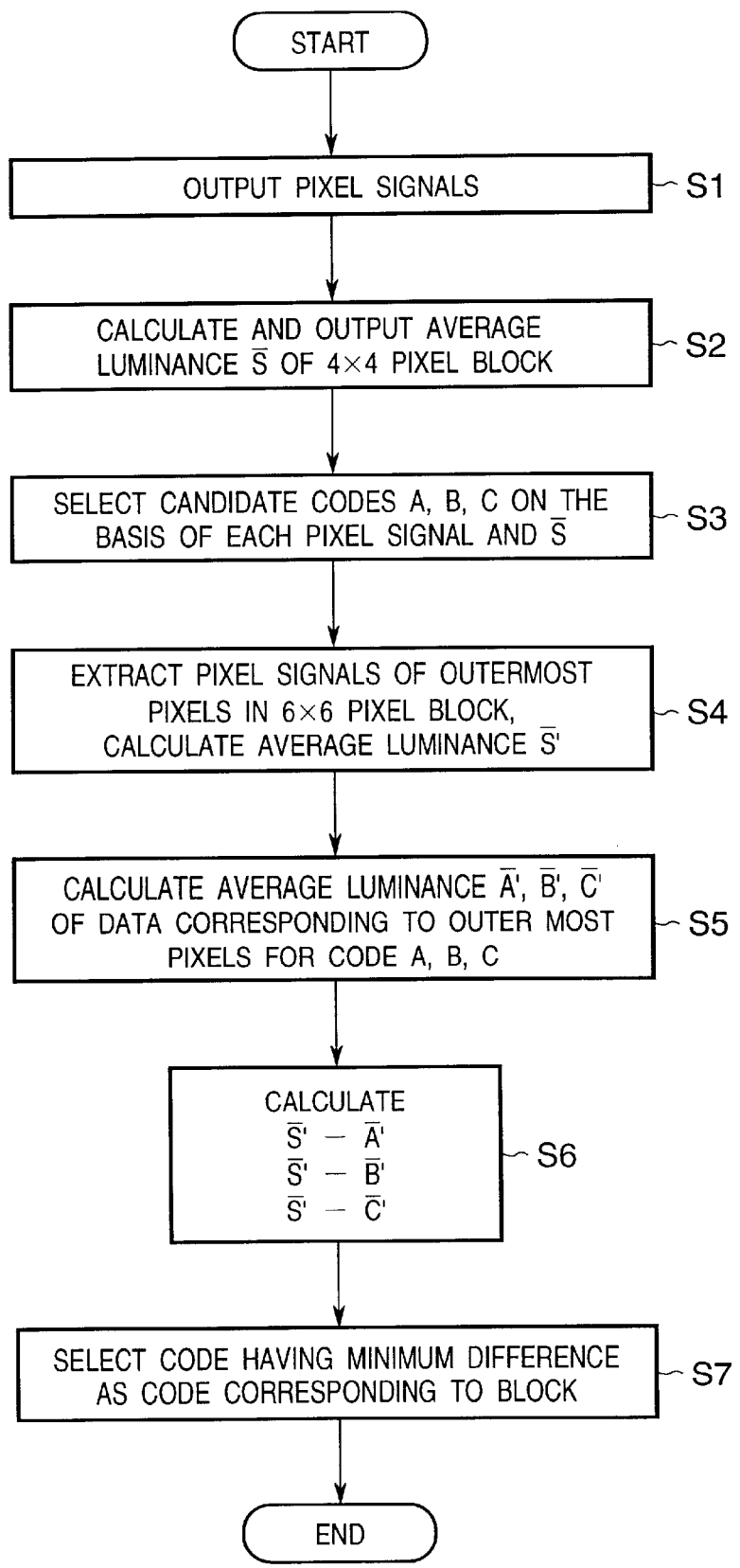
FIG. 16 is a flowchart showing a sequence of data compression in the code book method performed in the image sensing apparatus according to the first embodiment of the present invention.

FIG. 16 is a flowchart showing a processing sequence of information compression in the code book method using the image sensing device 10 according to the first embodiment.

As shown in FIG. 16, when the image sensing operation is initiated, a signal of each pixel in the sensor unit 11 is outputted in step S1, and signals corresponding to a predetermined number of pixels are stored in the block memory 15.

Then, after the pixel signals corresponding to a given pixel block configured with the predetermined number of pixels are stored in the block memory 15, the process proceeds to step S2 where average luminance, $\overline{S}$ (sum of products), of the given pixel block (in this case, a 4×4 pixel block) is calculated by the sum of products calculation unit 16 and outputted.

Next, in step S3, representative codes (vector quantization codes) A, B and C, corresponding to the given pixel block, are selected from a code book storage device (not shown) on the basis of the signals of the respective pixels and the calculated average luminance $\overline{S}$. Note, each code in the code book is stored in connection with its own sum of products, and, when selecting the candidate codes, codes having the sums of products which are close to the average luminance $\overline{S}$ are selected, thereby the codes A, B and C are selected in this case.

Next, the process proceeds to step S4, where signals of the outermost pixels in a 6×6 pixel block, as explained with reference to FIG. 15A, are extracted, and their average luminance $\overline{S}$ is calculated.

Next in step S5, average luminance, $\overline{A'}, \overline{B'}, \overline{C'}$ of data corresponding to outermost pixels of the candidate codes A, B and C are calculated.

Then, in step S6, differences between the average luminance $\overline{S}$ obtained in step S4 and the respective average luminance $\overline{A'}, \overline{B'}, \overline{C'}$ obtained in step S5 are calculated.

Thereafter, in step S7, the code having the minimum difference among the differences calculated in step S6 is selected from the candidate codes A, B and C as a code corresponding to the block to be compressed, then the code number of the selected code is outputted.

According to the first embodiment as described above, since a code is selected in the aforesaid manner, it is possible to easily select vector quantization code which smoothly connects boundaries of adjoining blocks, thereby realizing high quality image compression by vector quantization method.

Further, according to the first embodiment as described above, the steps S1, S2, and S4 are performed in the image sensing device 10, therefore, it is possible to perform image compression at high speed.

Further, pixel signals can be outputted from the image sensing device 10 by pixel blocks of a predetermined size, which is smaller than the frame size, thus, the sum of products calculation unit 16 does not have to wait long until signals of the necessary number of pixels are outputted from the sensor unit 11 and the waiting time is shortened. In addition required memory capacity for storing pixel signals is reduced.

It should be noted that, by storing the sum of products and the average luminance of the outermost pixels, such as $\overline{A'}, \overline{B'}, \overline{C'}$ of each code in correspondence with the respective code in the code book, it is possible to omit step S5, for instance. To the contrary, by calculating the sum of product of each code each time, it is possible to reduce the required memory capacity for storing the code book.

<Second Embodiment>

Next, the second embodiment of the present invention using the image sensing device 10 as described in the first embodiment is explained with reference to FIG. 17.

Figure 17:
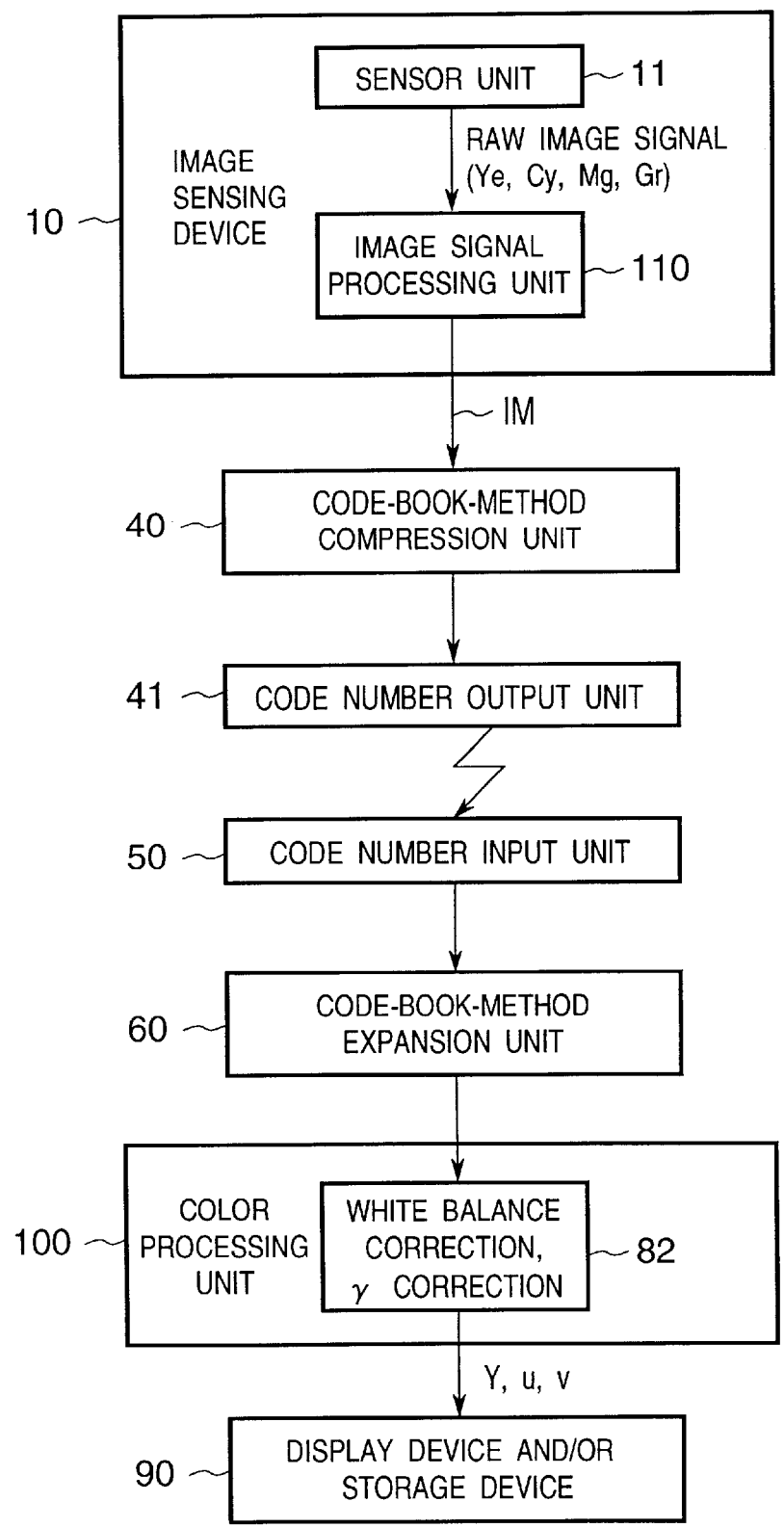
FIG. 17 is a block diagram illustrating a configuration of an image signal processing system using the image sensing device of the first embodiment according to the second embodiment of the present invention.

FIG. 17 is a block diagram of an image signal processing system including the image sensing device 10. As shown in FIG. 17, the image signal processing system includes the image sensing device (an IC chip) 10, a code-book-method compression unit 40, and a code number output unit 41, all of which are for outputting image signals. Further, the image signal processing system further comprises a code number input unit 50, a code-book-method expansion unit 60, a color processing unit 100, a display device and/or a storage device 90, all of which are for receiving the image signals.

The image sensing device 10 includes the sensor unit (light-receiving elements) 11 and an image signal processing unit 110, and outputs a pseudo Y' signal, a pseudo U' signal, and a pseudo V' signal as output signals IM.

The output signals IM from the image sensing device 10 are inputted to the code-book-method compression unit 40. The code-book-method compression unit 40 compares a pattern of the output signals IM of a predetermined number of pixels to patterns of a plurality of codes stored in a code book storage device (not shown) in advance.

In the code book storage device (not shown) of the second embodiment, the plurality of codes are stored in a pattern format corresponding to the output signals IM from the image sensing device 10, and the code-book-method compression unit 40 searches a pattern which is closest to the output signals IM, and the code number of the searched pattern is outputted. Then, the code number outputted from the code-book-method compression unit 40 is transmitted from the code number output unit 41 to the code number input unit 50 via a communication line, for instance.

The code number transmitted via the communication line is received via the code number input unit 50, then provided to the code-book-method expansion unit 60. The code-book-method expansion unit 60 reads a pattern corresponding to the inputted code number from a code book storage device (not shown), thereby reproduce the compressed image data.

The output signals IM reproduced by the code-book-method expansion unit 60 are then provided to the color processing unit 100. The color processing unit 100 includes circuits 82 for performing various processes, such as white balance correction and γ correction, on the output signals IM for obtaining an image of good quality.

In the aforesaid manner, the raw image signals Ye, Cy, Mg and Gr outputted from the code-book-method expansion unit 60 are applied with predetermined color processes by the color processing unit 100 where a luminance signal Y and color difference signals u and v are generated and outputted.

The luminance signal Y and the color difference signals u and v, all of which are outputted from the color processing unit 100, enter the display device or the storage device 90, where the signals are displayed or stored in a storage medium.

According to the image signal processing system of the second embodiment as described above, color correction processes for obtaining a high quality image are performed after the expansion process instead of being performed before the compression process. Therefore, deterioration of an image due to block noise and high frequency noise caused by compression and expansion is reduced to a minimum, the amount of information to be transmitted via a communication line is greatly reduced, and deterioration of image signals, processed with color processes, due to compression/expansion is restrained; accordingly, it is possible to obtain a high quality image.

<Third Embodiment>

Next, the third embodiment will be explained with reference to FIG. 18. In the second embodiment, compressed signals are outputted via a medium, such as a communication line. In the third embodiment, an example where the present invention is applied to an apparatus in which compressed signals are stored in a storage medium, read out from the storage medium, then applied with color processes after expanding the read compressed signals.

Figure 18:
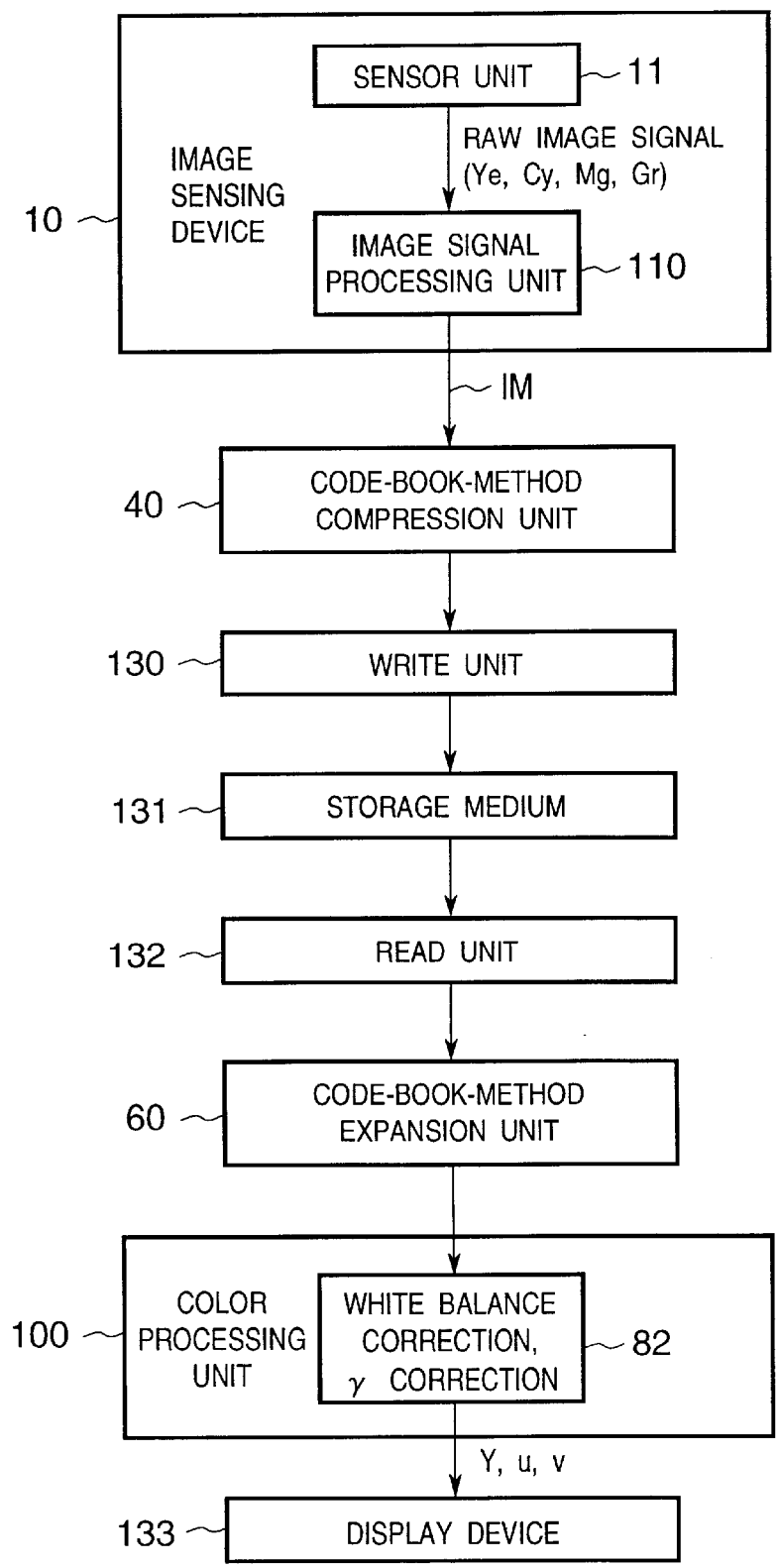
FIG. 18 is a block diagram illustrating a configuration of an image sensing apparatus using the image sensing device of the first embodiment according to the third embodiment of the present invention.

In FIG. 18, the elements and units as those shown in FIG. 17 are referred to by the same reference numerals, and explanation of them are omitted. The difference between FIGS. 17 and 18 is that a write unit 130, a storage medium 131, and a read unit 132 are provided between the code-book-method compression unit 40 and the code-book-method expansion unit 60.

By configuring the apparatus as described above, required capacity of internal memory is further reduced since image signals IM from the image sensing device 10 are stored in the storage medium 131. In addition, since color processes are performed by the color processing unit 100 after the image signals, read from the storage medium 131, are expanded by the code-book-method expansion unit 60, deterioration of an image remains low, and it is possible to display a high quality image on a display device 133.

It should be noted that the image sensing apparatus according to the third embodiment may not include the read unit 132 and its subsequent units. In this case, the read unit 132, the code-book-method expansion unit 60, the color processing unit 100, and the display device 133 may be included in a reproducing apparatus (e.g., a personal computer).

Further, the image signal processing unit 110 need not be provided on the same chip of the sensor unit 11 in the second and third embodiments. Further, an RGB filter may be used instead of the primary color filter.

Further, the code book method is used as compression/expansion method in the first to third embodiments, however, the present invention is not limited to this, and compression/expansion by discrete cosine transformation, quantization, variable length coding, for instance, may be performed instead.

Further, in the second and third embodiments as shown in FIGS. 17 and 18, the image signals Ye, Cy, Mg and Gr may be also inputted from the sensor unit 11 to the code-book-method compression unit 40.

<Fourth Embodiment>

Figure 19:
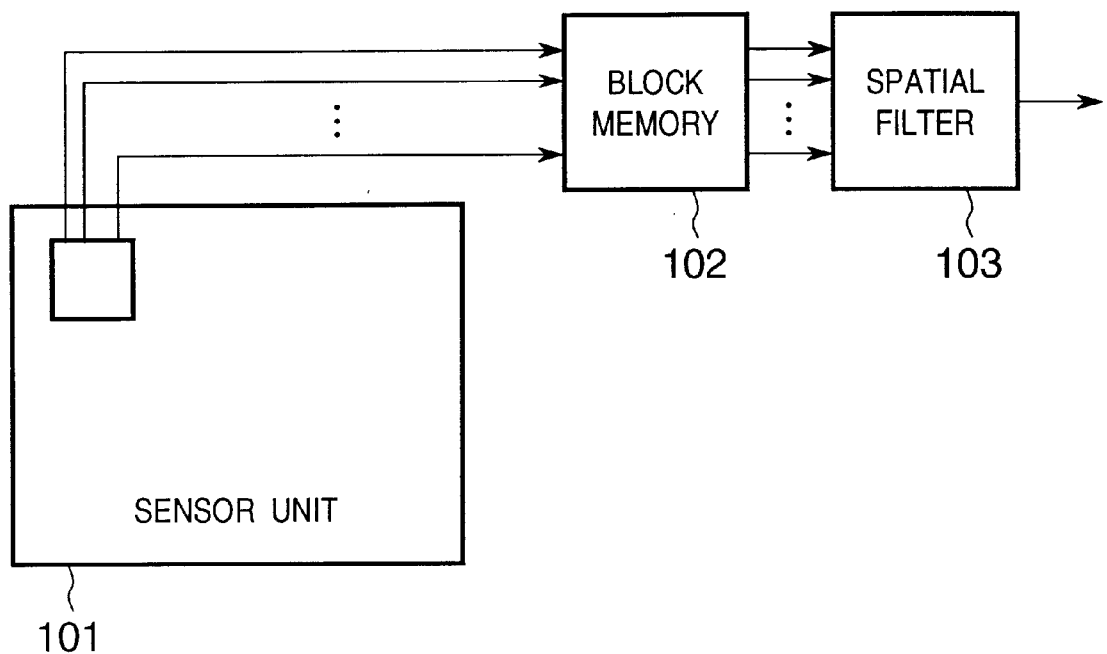
FIG. 19 is a block diagram illustrating a configuration of a solid-state image sensing device according to a fourth embodiment of the present invention.

FIG. 19 is a block diagram illustrating a configuration of a solid-state image sensing device. Referring to FIG. 19, the image sensing device according to the fourth embodiment has a sensor unit 101, block memory 102 for storing a plurality of pixel blocks of image signals read from the sensor unit 101 by the unit of pixel block, and a spatial filter 103 for applying spatial-filtering to the image signals, stored in the block memory 102, and outputting the filtered image signals.

Since the block memory 102 and the spatial filter 103 can be manufactured by the same semi-conductor processing for manufacturing the sensor unit 101, these units may be formed on the same semi-conductor substrate.

Further, it is possible to configure the image sensing device so that signals are outputted from the sensor unit 101 by pixel without processed by the block memory 102 and the spatial filter 103. Alternatively, it is also possible to configure the image sensing device so that signals are outputted from the sensor unit 101 by pixel via the block memory 102, but without being processed by the spatial filter 103.

Next, each unit of the image sensing device shown in FIG. 19 is explained.

Figure 20:
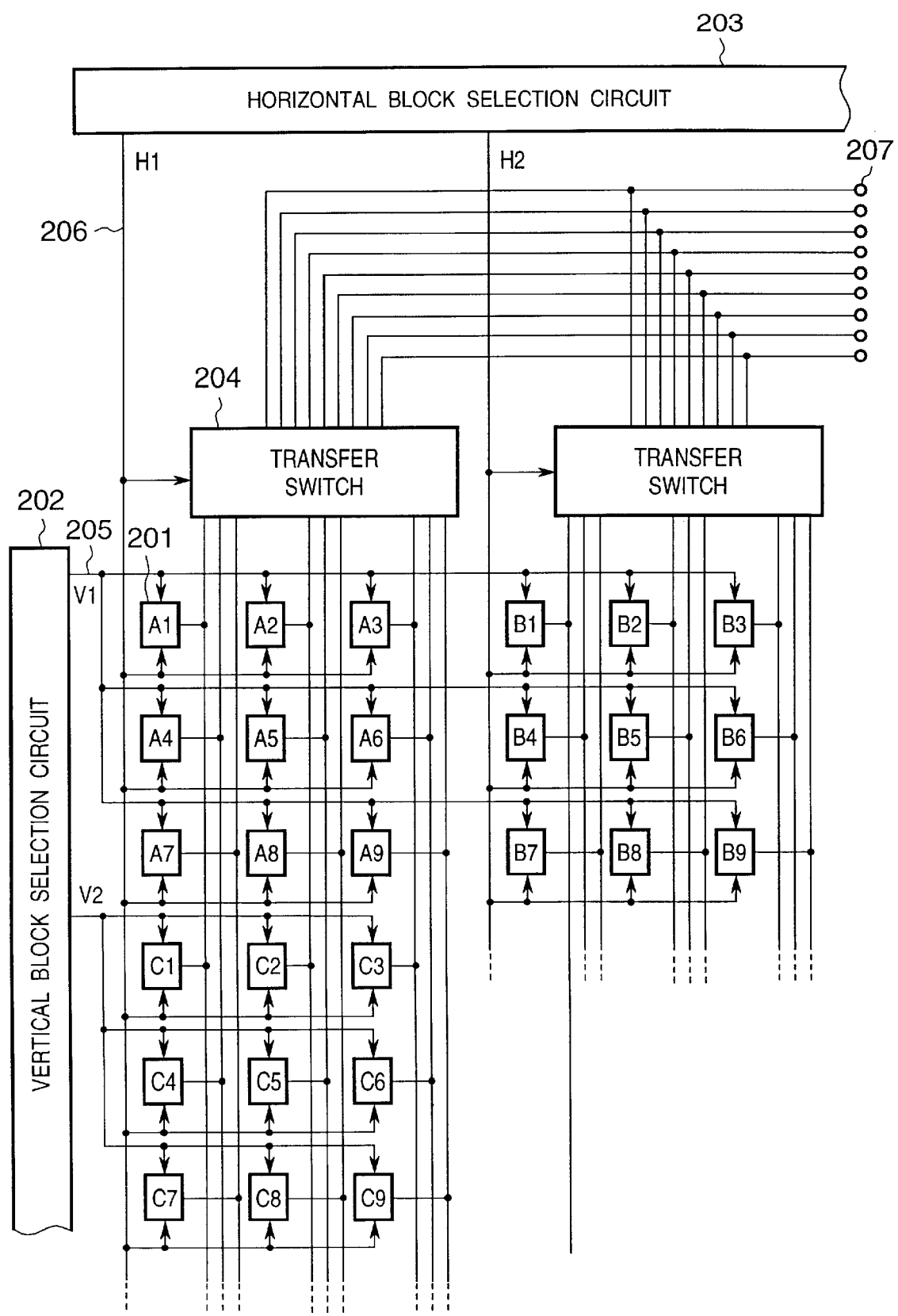
FIG. 20 is a block diagram illustrating a configuration of a sensor unit of the solid-state image sensing device shown in FIG. 19 according to the fourth embodiment of the present invention.

FIG. 20 is a block diagram illustrating a configuration of the sensor unit 101 according to the fourth embodiment of the present invention.

In FIG. 20, reference numeral 201 denotes each pixel cell formed by a photoelectric conversion element and its peripheral transistors; 202, a vertical block selection circuit for selecting a pixel block to be read in the vertical direction (i.e., selecting rows of pixel cells 201); 203, a horizontal block selection circuit for selecting a pixel block to be read in the horizontal direction (i.e., selecting columns of pixel cells 201); 207, each output terminal; 204, each transfer switch for outputting image signals of the selected block to the output terminals 207; 205, a row selection line; and 206, a column selection line. Note, in the fourth embodiment, each block includes 3×3 pixels; however, the block size may be arbitrarily changed.

The vertical block selection circuit 202 activates the row selection line 205 corresponding to a pixel block designated from outside. Similarly, the horizontal block selection circuit 203 activates column selection line 206 corresponding to the pixel block designated from outside. The row selection line 205 and the column selection line 206 are connected to each pixel cell 201, and the pixel cell 201 outputs its signal when both of the vertical and column selection lines 205 and 206 are activated. Accordingly, pixel signals of the selected block enter the transfer switch 204. Further, the transfer switch 204 outputs the received pixel signals only when the column selection line 206, connected to the transfer switch, is active; otherwise the output of the transfer switch 204 is at high-impedance. Therefore, all the signals of the selected pixel block are simultaneously outputted from the output terminals 207. The outputted signals of the selected pixel block are simultaneously or sequentially written to the block memory 102.

According to the configuration of the sensor unit as described above, signals of a selected pixel block are outputted quickly and simultaneously.

Figure 21:
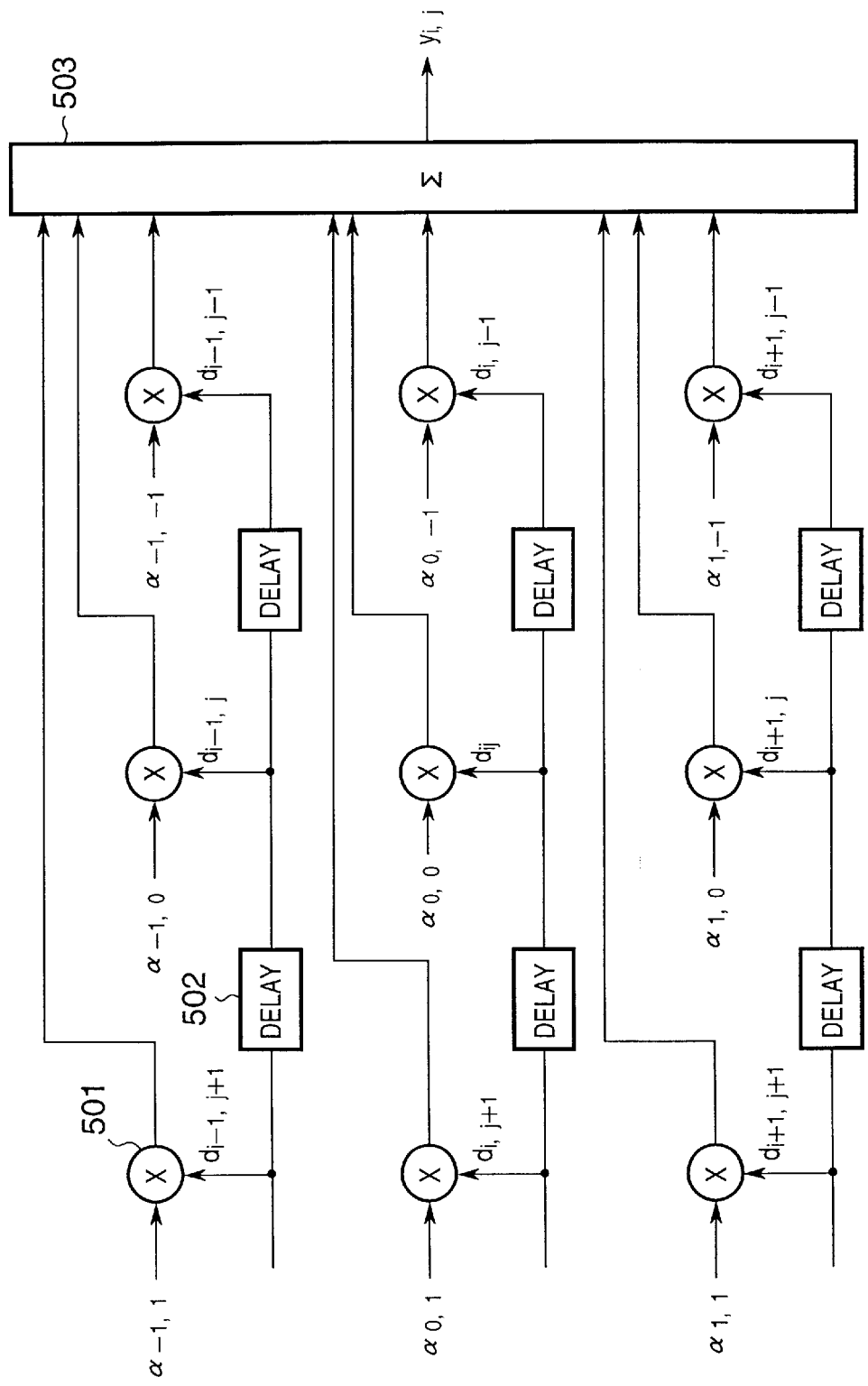
FIG. 21 is a diagram illustrating a configuration of a spatial filter of the solid-state image sensing device shown in FIG. 19 according to the fourth embodiment of the present invention.

FIG. 21 is a block diagram illustrating a configuration of the spatial filter 103 according to the fourth embodiment.

In FIG. 21, reference numeral 501 denotes a multiplier; 502, a delay element; and 503, an adder. In the fourth embodiment, a two-dimensional FIR filter having 3×3 taps is used as the spatial filter 103.

Pixel signals are inputted to the spatial filter 103 by the row of a selected pixel block. The delay elements 502 delay the input signals, and, by repeating inputting of pixel signals the necessary number of times, namely, the number of rows of the pixel block, in this case three, pixel signals of the pixel block are provided to the multipliers 501. For example, for performing filtering on signals of a 3×3 pixel block whose center pixel is $x_{i,j}$ (i and j indicate the row and column locations of the pixel x in the pixel cell 201), the respective multipliers 501 multiply pixel signals $d_{i+k,j+l}$ of pixels $x_{i+k,j+l}$ ($-1 \leq k \leq 1$, $-1 \leq l \leq 1$) by filter coefficients $\alpha_{k,l}$, respectively, output the obtained products to the adder 503, and the adder 503 sums up the nine products and outputs the sum.

Thus, an output $y_{i,j}$ of a 3×3 pixel block, whose center pixel is $x_{i,j}$, from the spatial filter 103 is, $$y_{i,j} = \Sigma_{k=-1}^{1} \Sigma_{l=-1}^{1} \alpha_{k,l} d_{i+k,j+l}$$

FIGS. 22A to 22D show examples of the filter coefficients $\alpha_{k,l}$ of the spatial filter 103. When the coefficients shown in FIG. 22B are used, the spatial filter 103 functions as a smoothing filter, when the coefficients shown in FIG. 22C are used, the spatial filter 103 functions as a horizontal high-pass filter for extracting an edge extending in the vertical direction, and, when the coefficients shown in FIG. 22D are used, the spatial filter 103 functions as a two-dimensional high pass filter for extracting an edge.

Note, in the configuration of the spatial filter 103 as shown in FIG. 21, the nine multipliers 501 are arranged in a 3×3 matrix using the six delay elements 502; however, it is possible to arrange the nine multipliers 501 in series using the eight delay elements 502. In this case, the spatial filter 103 has a single input terminal and image signals are inputted one by one via the input terminal.

Further, it is also possible to arrange all the multipliers 501 in parallel. In this case, outputs from the block memory 102 enter the respective multipliers 501 simultaneously.

Figure 23:
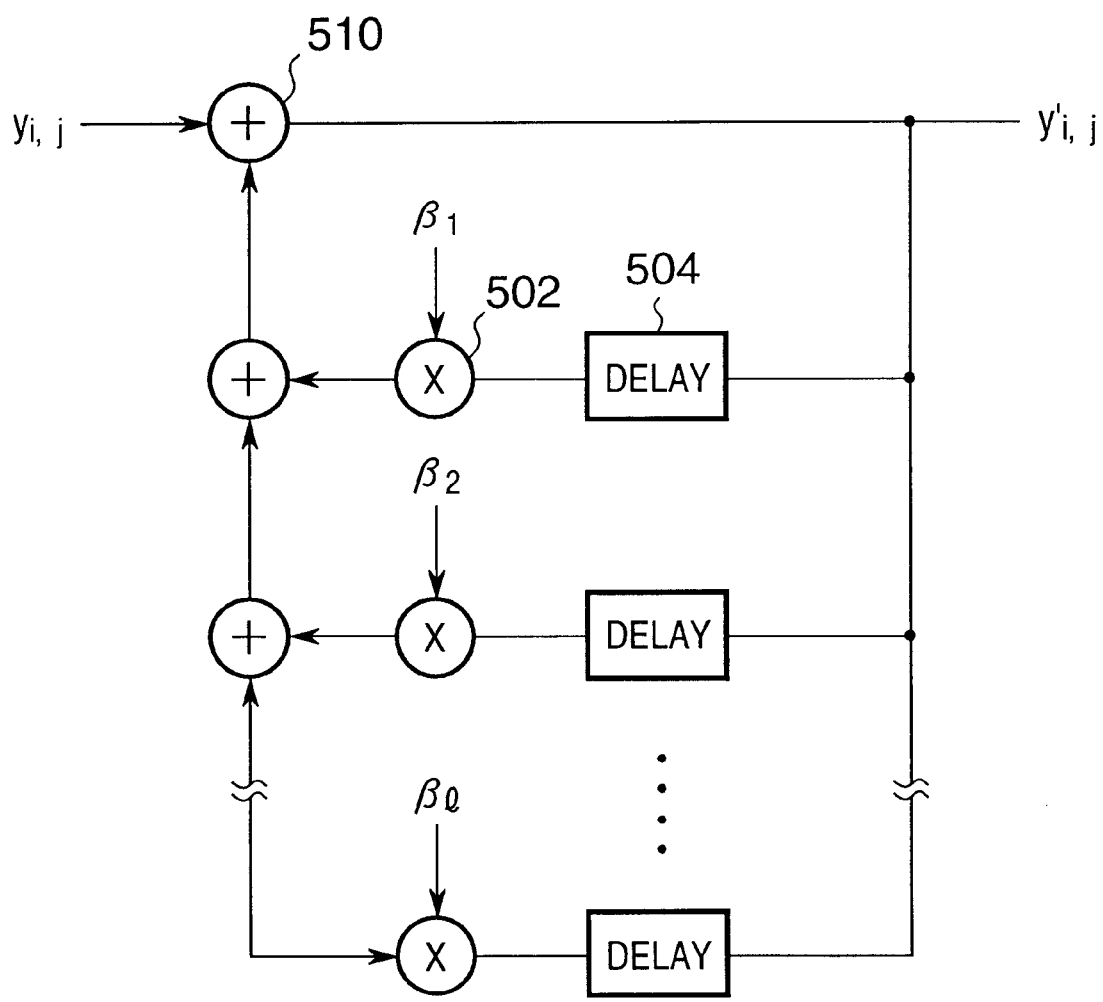
FIG. 23 is a diagram illustrating a configuration of an IIR filter element to be added to the configuration shown in FIG. 21.

Furthermore, a FIR filter is explained as the spatial filter 103 in the fourth embodiment; however, an IIR filter element having a configuration as shown in FIG. 23 may be added after the adder 503. In FIG. 23, reference numeral 510 denotes an adder; 502, a multiplier; and 504, a delay element.

Further, the horizontal direction and the vertical direction of the arrangement shown in FIG. 21 may be interchanged.

According to the fourth embodiments as described above, only block memory is required for performing spatial filtering processing; thus, the memory size required for performing spatial filtering processing is reduced.

Further, according to the fourth embodiment as described above, pixel signals are transferred to block memory in a short period and the spatial filter needs to have a small number of delay elements; therefore, it is possible to reduce delay time since the pixel signals are outputted from the sensor unit until filtered signals are outputted from the spatial filter.

Furthermore, according to the fourth embodiment as described above, since the block memory and the spatial filter may be manufactured in the same semi-conductor processing for manufacturing the sensor unit, a one-chip solid-state image sensing device capable of outputting signals which have been applied with spatial filter processing is provided; accordingly, it is possible to reduce manufacturing cost and the size of the device.

It should be noted that the configuration of the sensor unit 101 of the fourth embodiment may be used in place of the sensor unit 11, the vertical scanning circuit 12, the line memory 13, and the horizontal scanning circuit 14 used in the first to third embodiments.

<Fifth Embodiment>

Next, the fifth embodiment will be explained.

Figure 24:
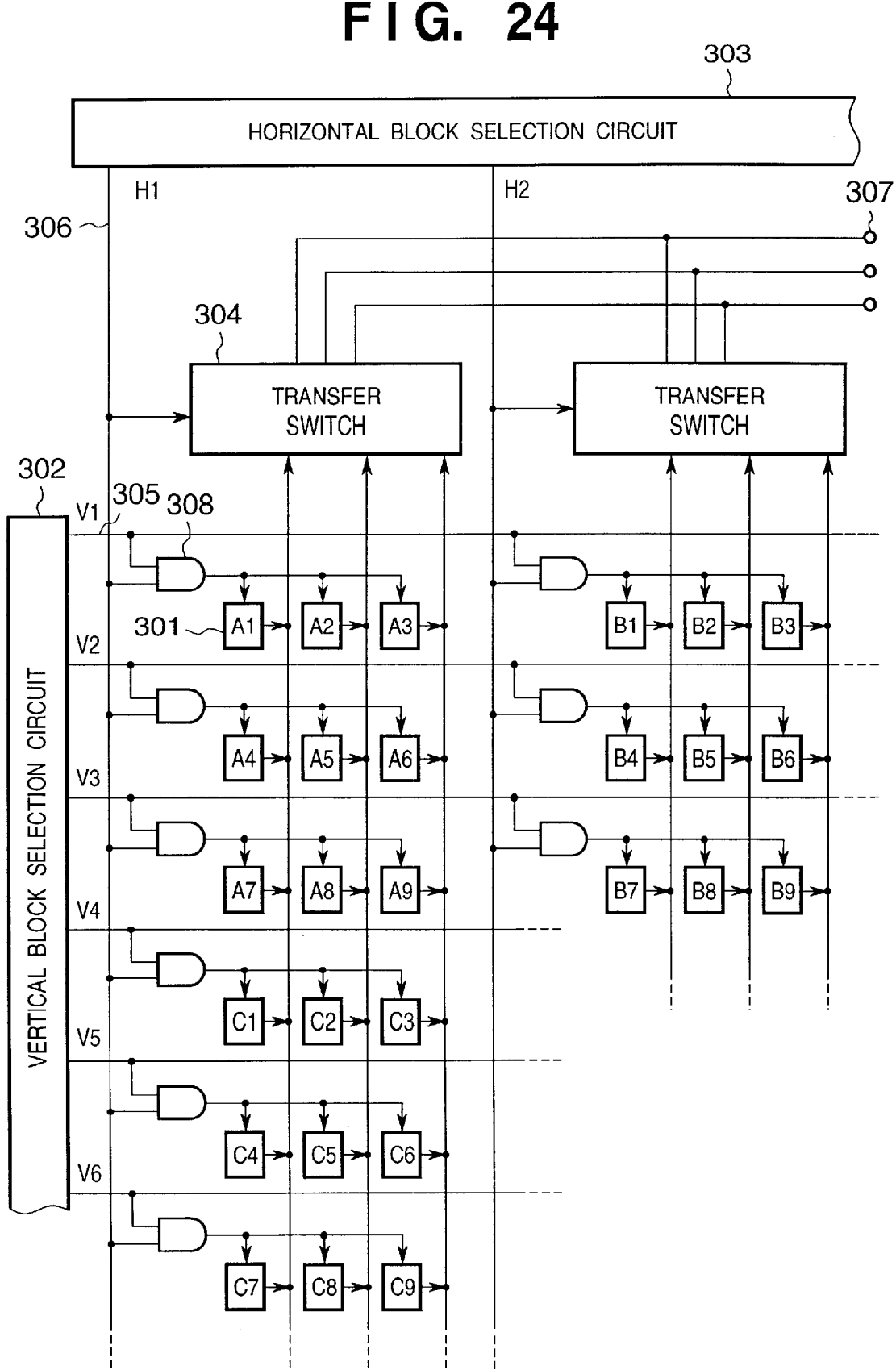
FIG. 24 is a block diagram illustrating another configuration of a sensor unit of the solid-state image sensing device shown in FIG. 19 according to a fifth embodiment of the present invention.

FIG. 24 is a block diagram illustrating another configuration of the sensor unit 101 according to the fifth embodiment of the present invention.

In FIG. 24, reference numeral 301 denotes each pixel cell formed by a photoelectric conversion element and its peripheral transistors; 302, a vertical block selection circuit for selecting a pixel block to be read in the vertical direction (i.e., selecting a row of pixel cells 301); 303, a horizontal block selection circuit for selecting a pixel block to be read in the horizontal direction (i.e., selecting a column of pixel cells 301); 307, each output terminal; 304, each transfer switch for outputting image signals of the selected block to the output terminals 307; 305, a row selection line; 306, a column selection line; and 308, an AND gate. Note, in the fifth embodiment, each block includes 3×3 pixels; however, the block size may be arbitrarily changed.

The vertical block selection circuit 302 sequentially activates the row selection lines 305 corresponding to a pixel block designated from outside. Similarly, the horizontal block selection circuit 302 activates column selection lines 306 corresponding to the pixel block designated from outside. The row selection line 305 and the column selection line 306 are connected to each AND gate 308, and the AND gate 308 outputs a HIGH (active) signal only when both of the vertical and column selection lines 305 and 306 are activated. The output from the AND gate 308 enters each pixel cell 301, and the pixel cell 301 outputs its signal only when the output from the AND gate 308 becomes HIGH. Accordingly, pixel signals which belong to the selected block enter the transfer switch 304 by the row. Further, the transfer switch 304 outputs the received pixel signals only when the column selection line 306, connected to the transfer switch, is active; otherwise the output of the transfer switch 304 is at high-impedance. Therefore, all the signals of a single row of the selected pixel block are simultaneously outputted from the output terminals 307. The outputted signals of the selected pixel block are simultaneously or sequentially written to the block memory 102.

According to the fifth embodiment as described above, it is possible to obtain the same advantages of the fourth embodiment.

Although speed for reading the signals by blocks is slower comparing to the fourth embodiment, since the signals are sequentially read out by the row, the number of lines for leading the signals from the pixel cells 301 to the transfer switch 304 is reduced.

It should be noted that the configuration of the sensor unit 101 of the fifth embodiment may be used in place of the sensor unit 11, the vertical scanning circuit 12, the line memory 13, and the horizontal scanning circuit 14 used in the first to third embodiments, or the sensor unit 101 of the fourth embodiment.

<Sixth Embodiment>

Next, the sixth embodiment will be explained.

Figure 25:
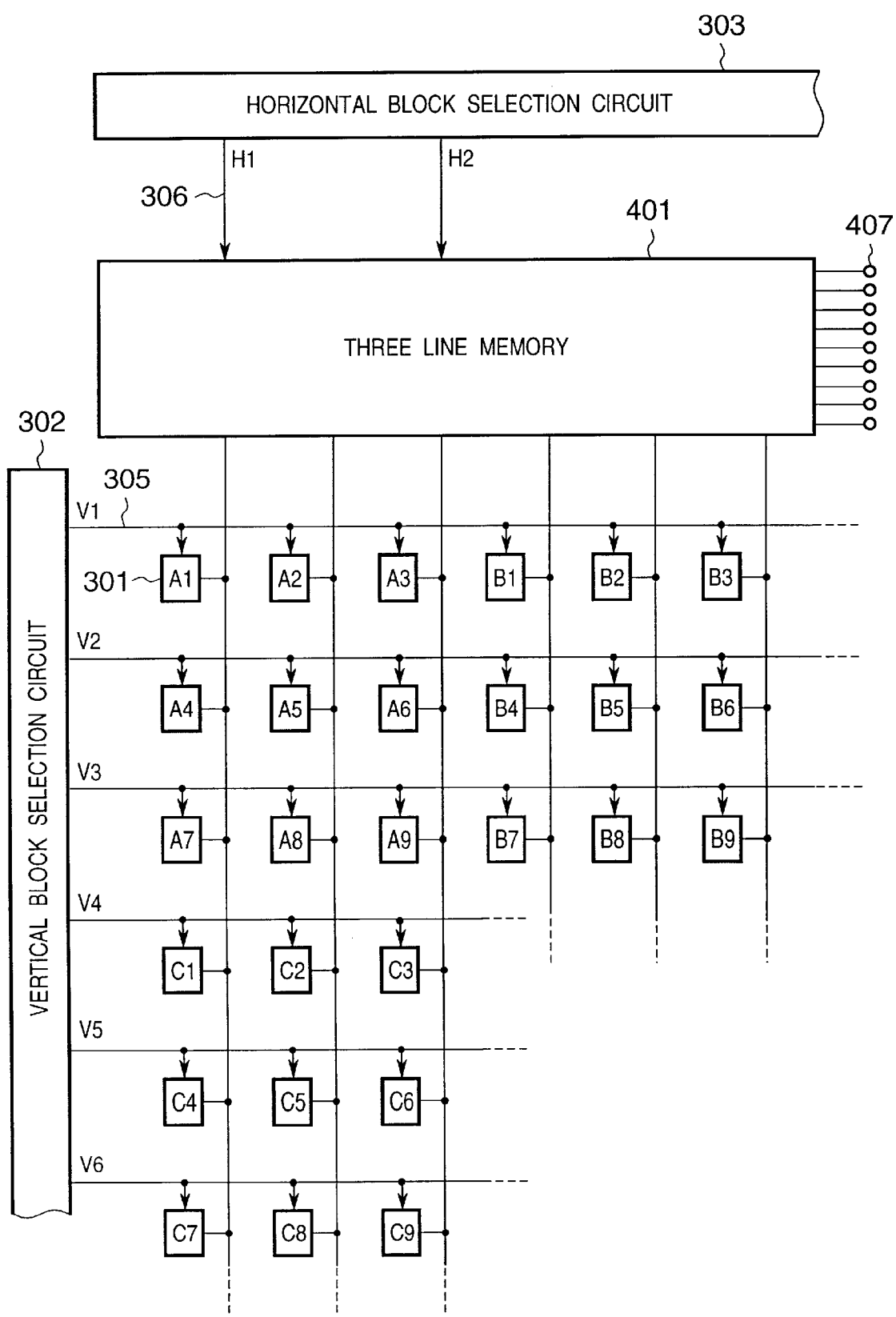
FIG. 25 is a block diagram illustrating another configuration of a sensor unit of the solid-state image sensing device shown in FIG. 19 according to a sixth embodiment of the present invention.

FIG. 25 is a block diagram illustrating another configuration of the sensor unit 101 according to the sixth embodiment of the present invention. Note, in FIG. 25, the same units and elements as those shown in FIG. 24 are referred to by the same reference numerals.

In FIG. 25, reference numeral 301 denotes each pixel cell formed by a photoelectric conversion element and its peripheral transistors; 302, a vertical block selection circuit for selecting a pixel block to be read in the vertical direction (i.e., selecting a row of pixel cells 301); 303, a horizontal block selection circuit for selecting a pixel block to be read in the horizontal direction (i.e., selecting a column of pixel cells 301); 305, a row selection line; 306, a column selection line; 407, each output terminal; and 401, three-line memory for outputting the image signals of the image signals of a selected block to the output terminals 407. Note, in the sixth embodiment, each block includes 3×3 pixels; however, the block size may be arbitrarily changed.

The vertical block selection circuit 302 sequentially activates the row selection lines 305 corresponding to a pixel block designated from outside. The row selection line 305 is connected to each pixel cell 301 of the corresponding row, and the pixel cell 301 output its signal when the row selection line 305 connected to the pixel cell is activated. Therefore, pixel signals in rows, in this case three rows, which belong to the selected block sequentially enter the three-line memory 401 a row at a time. Then, the three-line memory 401 outputs pixel signals corresponding to the column selection line 306 which is in HIGH state. Accordingly, all of the pixel signals of the selected block are simultaneously outputted from the output terminals 407. The outputted signals of the selected pixel block are simultaneously or sequentially written to the block memory 102.

According to the sixth embodiment as described above, it is possible to obtain the same advantages of the fourth embodiment.

Further, according to the sixth fourth embodiment as described above, similarly to the fifth embodiment, speed for reading the signals by blocks is slower comparing to the fourth embodiment, since the signals are sequentially read out by the row; however the number of lines for leading the signals from the pixel cells 301 to the three line memory 401 is reduced.

It should be noted that the configuration of the sensor unit 101 of the sixth embodiment may be used in place of the sensor unit 11, the vertical scanning circuit 12, the line memory 13, and the horizontal scanning circuit 14 used in the first to third embodiments, or the sensor unit 101 of the fourth embodiment.

<Seventh Embodiment>

Next, the seventh embodiment will be explained.

Figure 26:
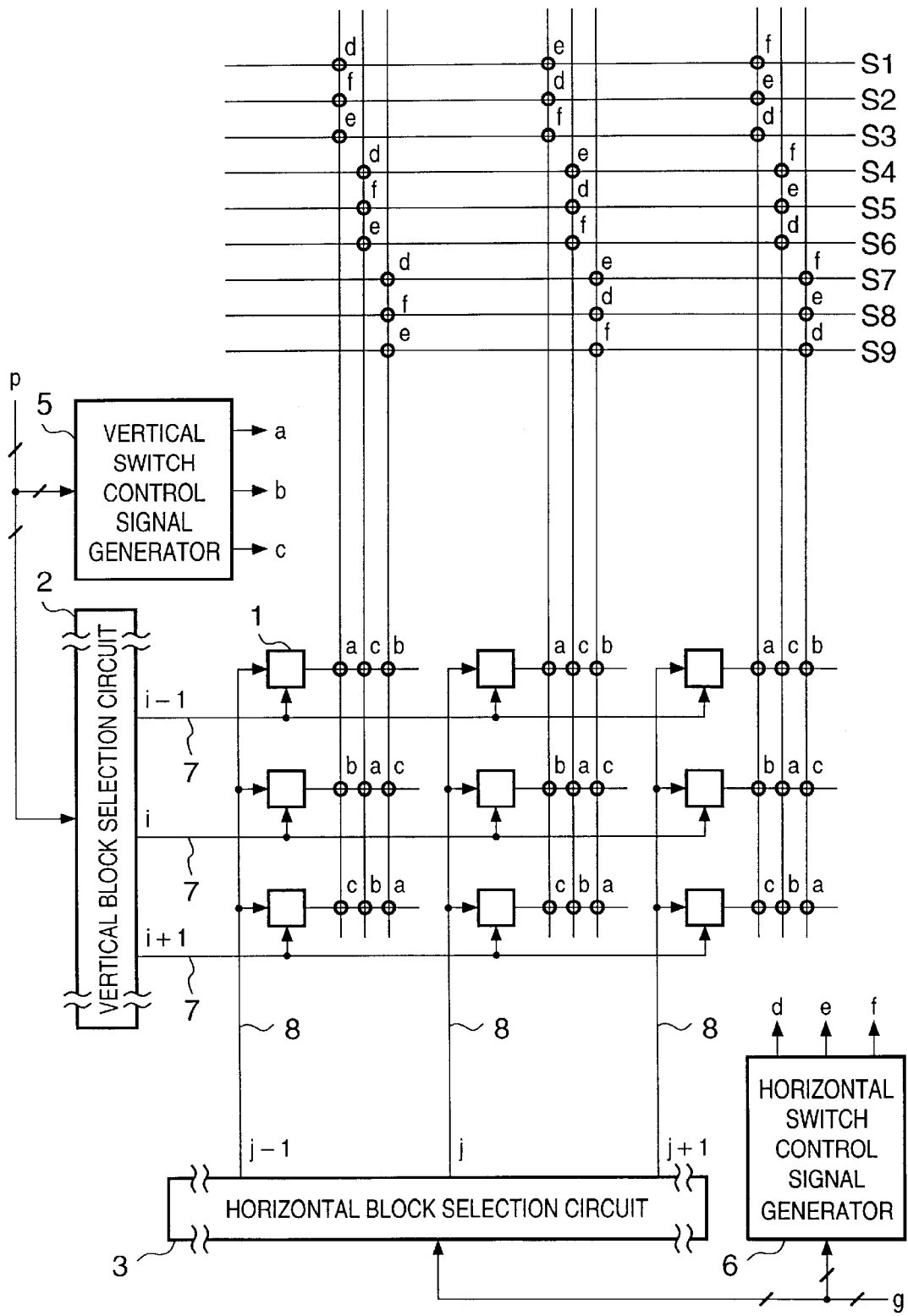
FIG. 26 is a block diagram illustrating another configuration of a sensor unit of the solid-state image sensing device shown in FIG. 19 according to a seventh embodiment of the present invention.

FIG. 26 is a block diagram illustrating a configuration of the sensor unit 101 according to the seventh embodiment.

In the seventh embodiment, the size of a pixel block is 3×3 pixels, for instance.

Referring to FIG. 26, reference numeral 1 denotes each pixel cell formed by a photoelectric conversion element and its peripheral transistors; 2, a vertical block selection circuit for selecting a pixel block to be read in the vertical direction (i.e., selecting rows of pixel cells 1); 3, a horizontal block selection circuit for selecting a pixel block to be read in the horizontal direction (i.e., selecting columns of pixel cells 1); 4, a switch; 5, a vertical switch control signal generator; 6, a horizontal switch control signal generator; 7, a row selection line; and 8, a column selection line.

Figure 27:
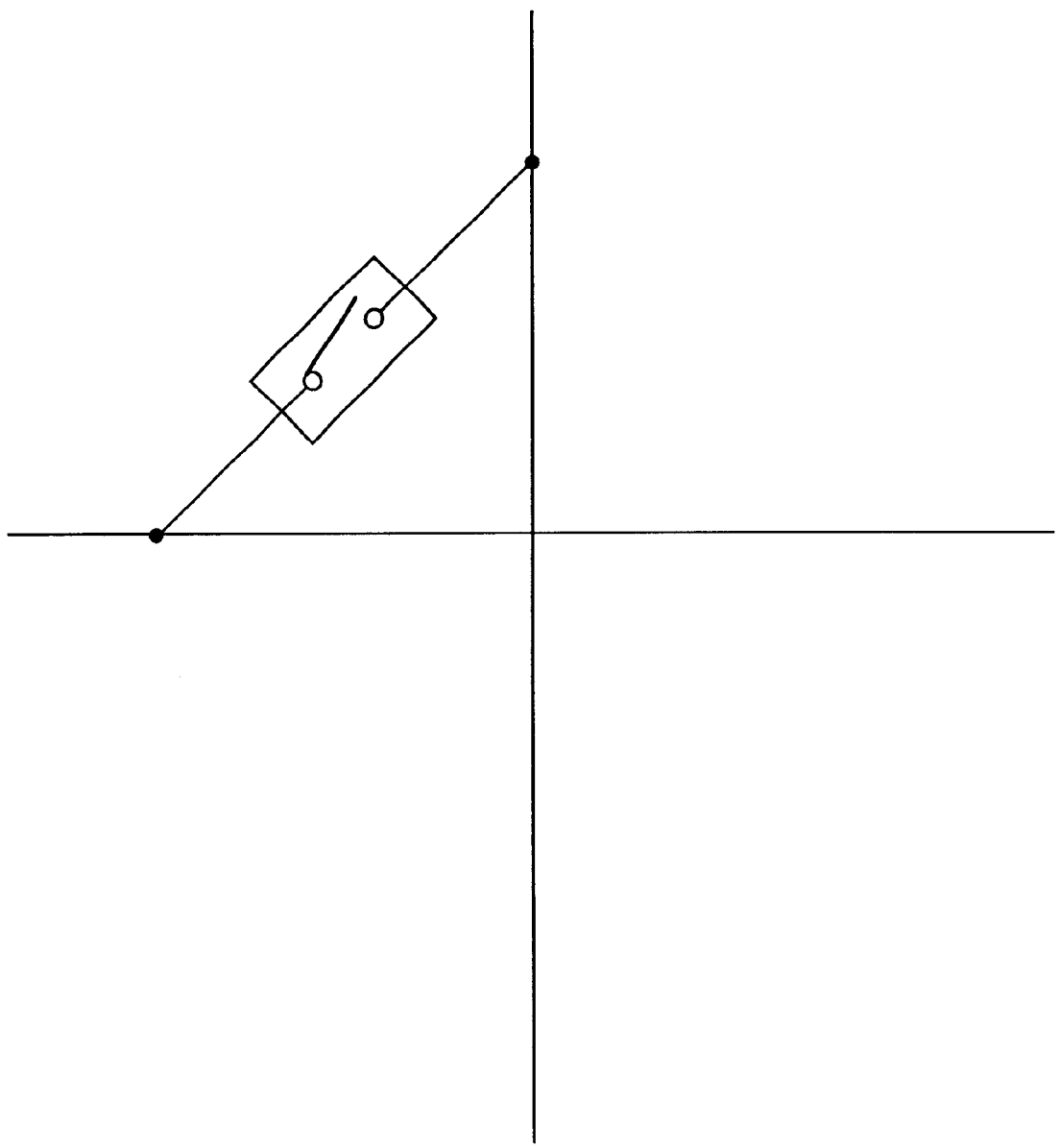
FIG. 27 is a diagram showing a detailed configuration of a switch of a sensor unit shown in FIG. 26.

Each switch 4 has a configuration as shown in FIG. 27. There are six groups of switches, a to f, which operate at the six different timing.

Next, an operation for reading pixel signals from the sensor unit 101 according to the seventh embodiment is explained.

A pixel block to be read is designated as a vertical direction p and a horizontal direction q from outside. The designation may be performed by another circuit in a solid-state image sensing apparatus or designated by the solid-state image sensing device.

When the vertical position p is designated, the vertical block selection circuit 2 activates row selection lines p−1, p, and p+1. Further, when the horizontal position q is designated, the horizontal block selection circuit 3 activates column selection lines q−1, q, and q+1.

The pixel cell 1 outputs its signal when both of the row and column selection lines connected to the pixel cell 1 become active.

When the vertical switch control signal generator 5 receives the vertical position p, it divides the position p by 3. If the reminder is 0, then the vertical switch control signal generator 5 activates a signal for operating a switch group a, out of three switch groups a, b and c; if the reminder is 1, then the vertical switch control signal generator 5 activates a signal for operating the switch group b; and if the reminder is 2, then the vertical switch control signal generator 5 activates a signal for operating the switch group c.

Further, when the horizontal switch control signal generator 6 receives the horizontal position q, it divides the position q by 3. If the reminder is 0, then the horizontal switch control signal generator 6 activates a signal for operating a switch group d, out of three switch groups d, e and f; if the reminder is 1, then the horizontal switch control signal generator 6 activates a signal for operating the switch group e; and if the reminder is 2, then the horizontal switch control signal generator 6 activates a signal for operating the switch group f.

Therefore, when the vertical position p and the horizontal position q are designated, the sensor unit 101 outputs signals accumulated by pixels (p−1, q−1), (p−1, q), (p−1, q+1), (p, q−1), (p, q), (p, q+1), (p+1, q−1), (p+1, q), and (p+1, q+1) are outputted via output lines S1 to S9.

It should be noted that the configuration of the sensor unit 101 of the seventh embodiment may be used in place of the sensor unit 11, the vertical scanning circuit 12, the line memory 13, and the horizontal scanning circuit 14 used in the first to third embodiments, or the sensor unit 101 of the fourth embodiment.

<Eighth Embodiment>

Next, the eighth embodiment will be explained.

Figure 28:
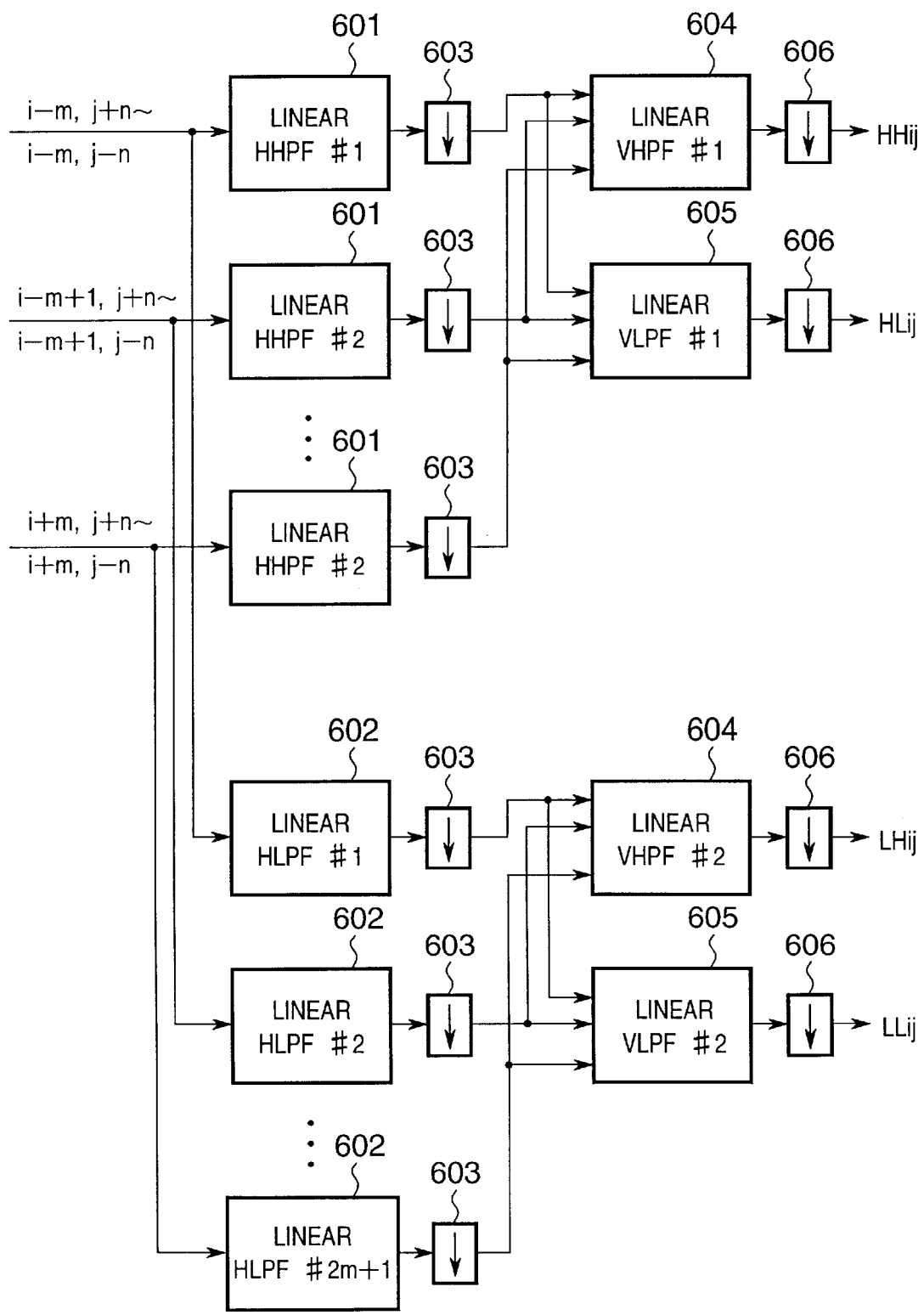
FIG. 28 is a block diagram illustrating another configuration of a spatial filter of the solid-state image sensing device shown in FIG. 19 according to an eighth embodiment of the present invention.

FIG. 28 is a block diagram illustrating another configuration of the spatial filter 103 according to the eighth embodiment. The spatial filter 103 in the eighth embodiment is a sub-band filter.

In FIG. 28, reference numeral 601 denotes a linear horizontal high-pass filter (HHPF); 602, a linear horizontal low-pass filter (HLPF); 603, a sub-sampling unit; 604, a linear vertical high-pass filter (VHPF); 605, a linear vertical low-pass filter (VLPF), and 606 a sub-sampling unit.

Figure 29:
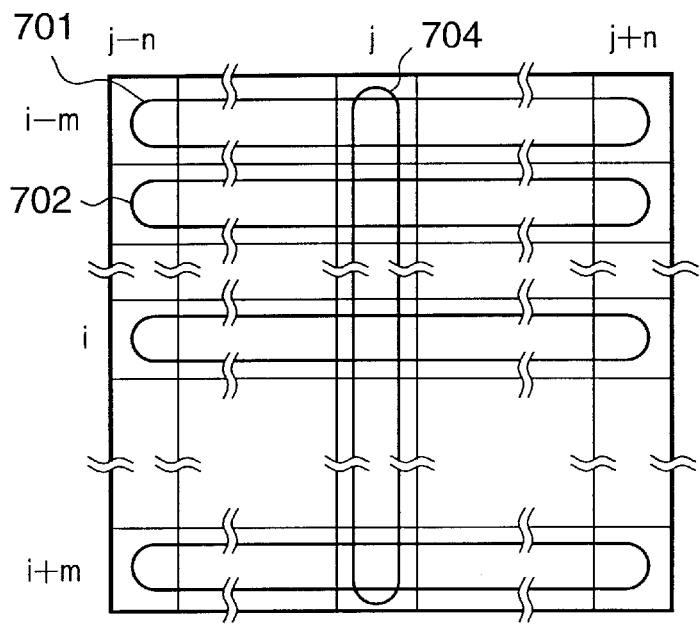
FIG. 29 is a diagram for explaining areas of a block for spatial filtering processing.

A case of performing spatial filtering processing by pixel blocks as shown in FIG. 29 is explained. When the center pixel of the block is $x_{i,j}$ (i and j indicate the row and column locations of the pixel x in the sensor unit 101), the same number of the linear HHPFs 601 and the linear HLPFs 602 as the larger number of the number of rows of the block, 2m+1, or the number of columns of the block, 2n+1, are prepared. In this case, it is assumed that 2m+1≧2n+1, and the 2m+1 linear HHPFs 601 and the 2m+1 linear HLPFs 602 are arranged in parallel.

To the linear HHPFs 601 and the linear HLPFs 602, signals of rows in the column are sequentially inputted to the corresponding filters by the column. As a result, signals in an area 701 of the block are eventually inputted to the linear HHPF 601 #1 and the linear HLPF 602 #1 where filtering processing is applied to the inputted signals, signals in an area 702 of the block are eventually inputted to the linear HHPF 601 #2 and the linear HLPF 602 #2 where filtering processing is applied to the inputted signals, and so forth. Thus, each set of the linear HHPF 601 and the linear HLPF 602 perform filtering processing on signals of a corresponding row.

The sub-sampling units are connected to the respective outputs of the linear HHPFs 601 and the linear HLPFs 602, and sub-sample the outputs from the linear HHPFs 601 and the linear HLPFs 602 by one half of the horizontal sampling rate. As the result of the sub-sampling process, signals, outputted from two sets of the 2m+1 sub-sampling units 603, corresponding to an area 704 shown in FIG. 29 are inputted to the linear VHPFs 604 and the linear VLPFs 605, which perform spatial filtering processing in the vertical direction.

The signals outputted from the linear VHPFs 604 and the linear VLPFs 605 enter the sub-sampling units 606, where the signals are sub-sampled in the vertical direction. As the result of the sub-sampling process, a diagonal high frequency component $HH_{i,j}$, a horizontal high frequency component $HL_{i,j}$, a diagonal low frequency component $LH_{i,j}$, and a horizontal low frequency component $LL_{i,j}$ are outputted from the respective sub-sampling units 606.

Figure 30:
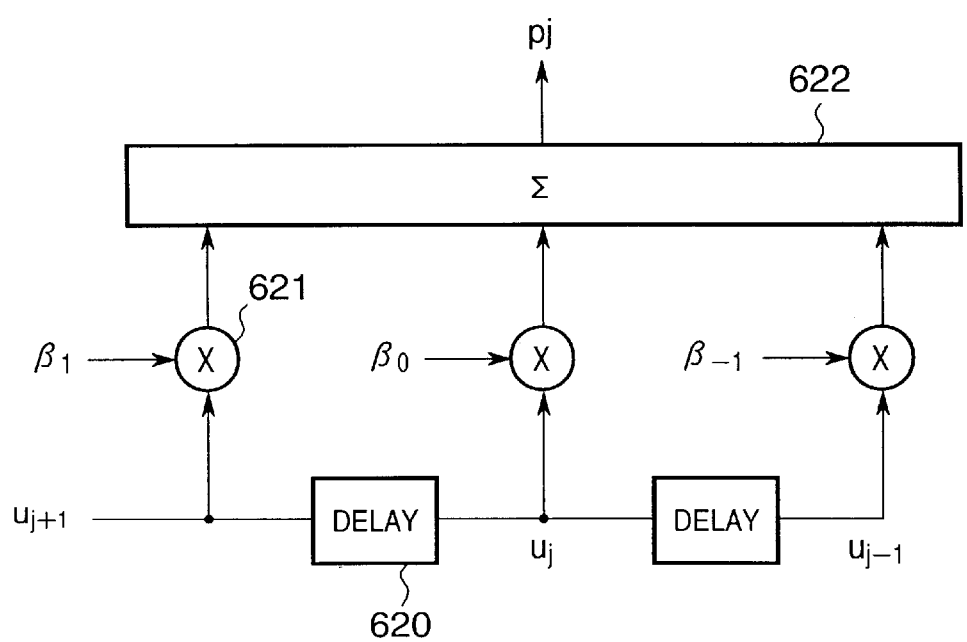
FIG. 30 is a block diagram illustrating a configuration of a linear horizontal high-pass filter and a linear horizontal low pass filter shown in FIG. 28.

FIG. 30 shows a configuration of the linear HHPF 601 and the linear HLPF 602 when the number of columns of a block is three. Referring to FIG. 30, each filter is configured with two delay elements 620, three multipliers 621, and an adder 622.

Figure 31:
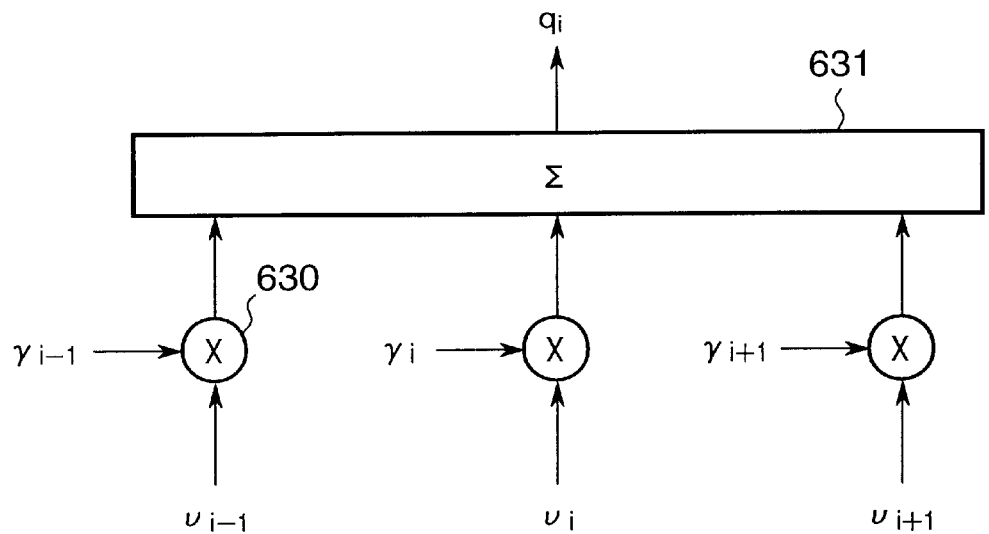
FIG. 31 is a block diagram illustrating a configuration of a linear vertical high-pass filter and a linear vertical low-pass filter shown in FIG. 28.

FIG. 31 shows a configuration of the linear VHPF 604 and the linear VLPF 605 when the number of rows of a block is three. Referring to FIG. 31, each filter is configured with three multipliers 630 and an adder 631.

Note, in the configuration of the linear horizontal HPF 601 and the linear horizontal LPF 602 as described in FIG. 30, the three multipliers 621 are arranged using two delay elements, however, it is possible to arrange all the multipliers 621 in parallel. In this case, signals of all the columns (i.e., three columns) of the block are simultaneously inputted to respective input terminals of the multipliers 621.

Further, a FIR filter is used as the spatial filter 103 in the eighth embodiment; however, the present invention is not limited to this, and an IIR filter element having a configuration as shown in FIG. 23 may be added after each of the linear HHPFs 601, the linear HLPFs 602, the linear VHPFs 604, and the linear VLPFs 605.

Further, the horizontal direction and the vertical direction of the arrangement shown in FIG. 28 may be interchanged.

According to the eighth embodiment as described above, it is possible to obtain the same advantages of the fourth embodiment.

It should be noted that the sensor unit 11, the vertical scanning circuit 12, the line memory 13, and the horizontal scanning circuit 14 used in the first to third embodiments, or the sensor unit 101 of the fifth or sixth embodiments may be used in place of the sensor unit 101 of the eighth embodiment having a configuration described in the fourth embodiment.

<Ninth Embodiment>

Next, the ninth embodiment will be explained.

Figure 32:
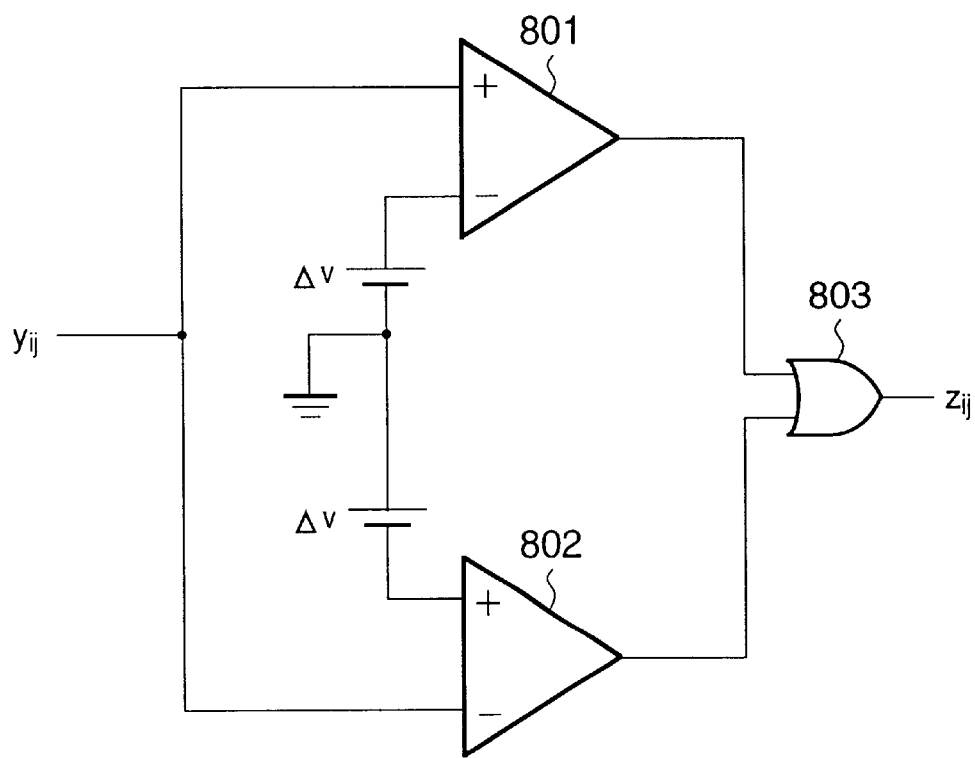
FIG. 32 is a block diagram illustrating a configuration of a binarization circuit.

It is possible to use a band-pass filter, a high-pass filter as the spatial filter 103, as described in the fourth embodiment, and add a binarization circuit, as shown in FIG. 32, after the filter. With this configuration, the binarization circuit can extract and output a contour signal.

In the binarization circuit shown in FIG. 32, reference numerals 801 and 802 denote comparators, and reference numeral 803 denotes an AND circuit. The binarization circuit having the aforesaid configuration outputs HIGH when the absolute value of an input signal exceeds a predetermined voltage ΔV.

It should be noted that the sensor unit 11, the vertical scanning circuit 12, the line memory 13, and the horizontal scanning circuit 14 used in the first to third embodiments, or the sensor unit 101 of the fifth or sixth embodiments may be used in place of the sensor unit 101 of the eighth embodiment having a configuration described in the fourth embodiment.

Figure 33:
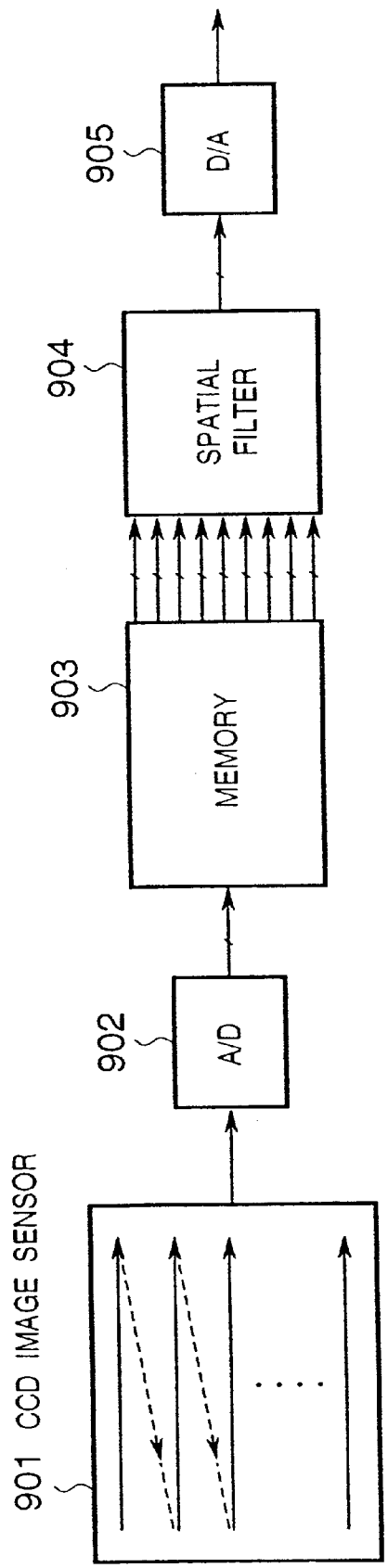
FIG. 33 is a block diagram illustrating a configuration of a conventional solid-state image sensing apparatus.

In the fourth to seventh embodiments as described above, depending upon the type of the spatial filter 103 or, when the sensor unit 101 is applied to the first to third embodiments, the type of the compression unit and/or the expansion unit, pixel signals of a block which partially overlaps the adjoining block either in the horizontal or vertical direction may be required. In such cases, signals of necessary numbers of blocks are read from the sensor unit 101 and stored in the block memory 102. In this case, the required capacity of the block memory 102 is to store signals of a necessary number of blocks depending upon the type of the spatial filter 103 or of the compression and/or expansion unit, which is much smaller than the capacity of the memory 903 in the conventional image sensing apparatus as shown in FIG. 33.

Especially, in a case where signals of a block which overlaps another block in the vertical direction are required, the block memory 102 having the capacity to store signals of required number of rows may be used in order to reduce the number of reading operation of reading signals from the sensor unit 101.

Further, the object of the first to third embodiments of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. An image sensing device comprising:
   a sensor unit having a plurality of pixels arranged in two dimensions;
   a plurality of capacitors;
   a controller adapted to separately transfer to said capacitors signals of the pixels in a pixel block which includes a predetermined number of pixels arranged in two dimensions in said sensor unit while shifting a position of the pixel block in two dimensions, wherein the size of the pixel block is smaller than the size of the sensor unit, and read out the transferred signals from said capacitors before transferring signals of pixels in a next pixel block;
   a plurality of output lines adapted to separately output signals from said plurality of capacitors in parallel; and
   a signal processor adapted to input the signals from said plurality of output lines in parallel and calculate a sum of the signals.

2. The image sensing device according to claim 1, wherein said controller controls to read signals by pixel blocks so that at least two adjoining positions of pixel blocks in the horizontal or vertical direction partially overlap each other.

3. The image sensing device according to claim 1, wherein said signal processor multiplies the signals of each pixel block by weights and adds the weighted signals.

4. The image sensing device according to claim 1, wherein said sensor unit, said plurality of capacitors, said plurality of output lines, said controller and said signal processor are formed on a single IC chip.

5. The image sensing device according to claim 1, further comprising a plurality of second capacitors capable of storing signals of a plurality of lines of said sensor unit,
   wherein said controller controls sequentially and separately to transfer signals to said second capacitors by lines, and separately transfer the signals from said second capacitors to said plurality of capacitors by pixel blocks.

6. An image sensing device comprising:
   a sensor unit having a plurality of pixels arranged in two dimensions;
   a plurality of capacitors;
   a controller adapted to separately transfer to said capacitors signals of the pixels in a pixel block which includes a predetermined number of pixels arranged in two dimensions in said sensor unit while shifting a position of the pixel block in two dimensions, wherein the size of the pixel block is smaller than the size of the sensor unit, and read out the transferred signals from said capacitors before transferring signals of pixels in a next pixel block;
   a plurality of output lines adapted to separately output signals from said plurality of capacitors in parallel; and
   a spatial filter circuit adapted to input the signals from said plurality of output lines in parallel and perform a spatial filter operation on the signals.

7. The image sensing device according to claim 6, further comprising a plurality of second capacitors capable of storing signals of a plurality of lines of said sensor unit,
   wherein said sensor unit is configured by a two-dimensional arrangement of said pixel blocks, the plurality of pixels in each pixel block being arranged in two dimensions, and
   wherein said controller controls sequentially and separately to transfer signals to said plurality of second capacitors by lines, and separately transfer the stored signals from said plurality of second capacitors to said plurality of capacitors by pixel blocks.

8. The image sensing device according to claim 7, wherein said plurality of capacitors store signals from a linearly-arranged subset of said pixel blocks, and said controller sequentially transfers the signals from said plurality of capacitors to said plurality of output lines by pixel blocks.

9. The image sensing device according to claim 6, wherein said spatial filter circuit includes a low pass filter circuit and a high pass filter circuit.

10. The image sensing device according to claim 6, wherein said spatial filter circuit includes an adder and a multiplier which performs multiplication by a predetermined coefficient.

11. The image sensing device according to claim 6, wherein said sensor unit, said plurality of capacitors, said plurality of output lines, said controller, and said spatial filter circuit are formed on a single IC chip.

12. The image sensing device according to claim 7, wherein said sensor unit, said plurality of second capacitors, said plurality of output lines, said controller, said spatial filter circuit, and said plurality of capacitors are formed on a single IC chip.

* * * * *

UNITED STATES PATENT AND TRADEMARK OFFICE
CERTIFICATE OF CORRECTION

PATENT NO.    : 6,567,571 B1
DATED         : May 20, 2003
INVENTOR(S)   : Tetsunobu Kochi et al.

It is certified that error appears in the above-identified patent and that said Letters Patent is hereby corrected as shown below:

Title page,
Item [57], ABSTRACT,
Line 3 "applied" should read -- applied to --; and "operation" should be deleted.

Drawings,
Sheet 3, FIG. 3, "PRIOR ART" should be deleted.

Column 1,
Line 13, "variety" should read -- a variety --.

Column 2,
Line 28, "sum" should read -- a sum --;
Lines 34 and 40, "to" should be deleted.

Column 5,
Line 19, "configures" should read -- configure --;
Line 22, "2B or 2C," should read -- FIG. 2B or FIG. 2C, --.

Column 6,
Line 20, "condenser" should read -- condensers --;
Line 36, "number" should read -- number of --.

Column 8,
Line 3, "resembles" should read -- resembling --;
Line 48, "luminance $\bar{S}$" should read -- luminance $\overline{S'}$ --;
Line 53, "nance $\bar{S}$" should read -- nance $\overline{S'}$ --.

Column 9,
Line 56, "reproduce" should read -- reproducing --.

Column 10,
Line 29, "are" should read -- is --.

Column 11,
Line 13, "processed" should read -- being processed --.

Column 12,
Line 11, " $y_{i,j} = \sum_{k=-1}^{1} \sum_{l=-1}^{1} \alpha_{k,l} d_{i+k,j+l}$ " should read -- $y_{i,j} = \sum_{k=-1}^{1} \sum_{l=-1}^{1} \alpha_{k,l} d_{i+k,j+l}$ --.

UNITED STATES PATENT AND TRADEMARK OFFICE
CERTIFICATE OF CORRECTION

PATENT NO. : 6,567,571 B1
DATED : May 20, 2003
INVENTOR(S) : Tetsunobu Kochi et al.

It is certified that error appears in the above-identified patent and that said Letters Patent is hereby corrected as shown below:

Column 13,
Line 31, "high-impedance." should read -- high impedance --;
Line 32, "block" should read -- blocks --.

Column 14,
Line 6, "output" should read -- outputs --;
Line 20, "fourth" should be deleted;
Line 51, "timing." should read -- timings. --.

Column 15,
Lines 3, 5, 7, 12, 15 and 17, "reminder" should read -- remainder --;
Line 47, "block," should read -- blocks, --;
Line 48, "block," should read -- blocks --;
Line 62, "perform" should read -- performs --.

Column 17,
Line 18, "operation" should read -- operations --;
Line 55, "appraise" should read -- apprise --.

Signed and Sealed this

Seventeenth Day of February, 2004

JON W. DUDAS
*Acting Director of the United States Patent and Trademark Office*